INVENTOR.
ROBERT R. WILLIAMSON

ATTORNEY

SINE GENERATION

COSINE GENERATION

SINE GENERATION

COSINE GENERATION

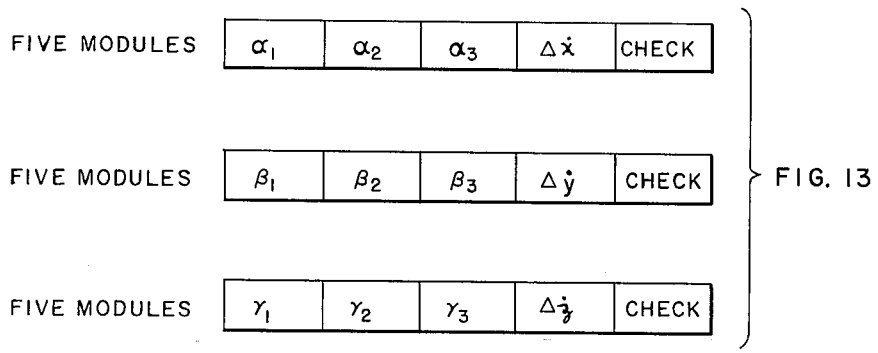
FIG. 13
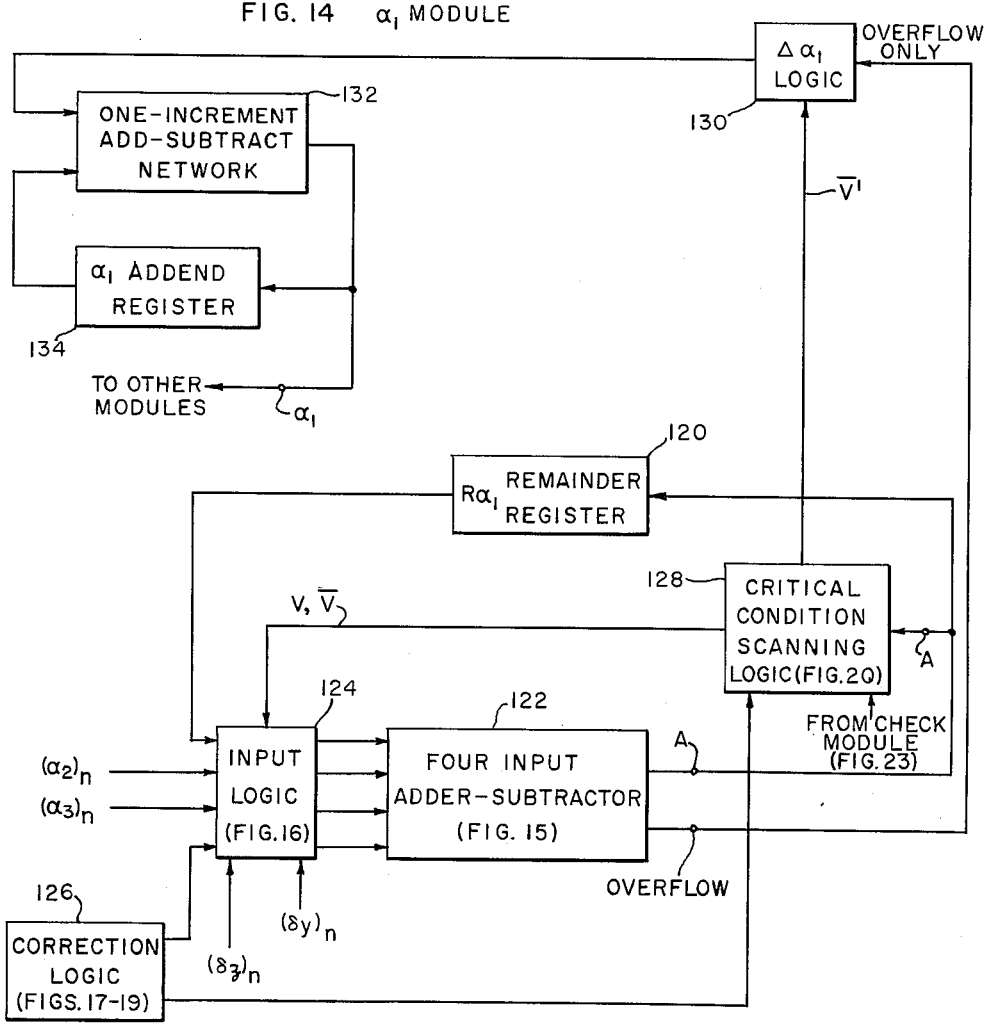
FIG. 14 $\alpha_1$ MODULE

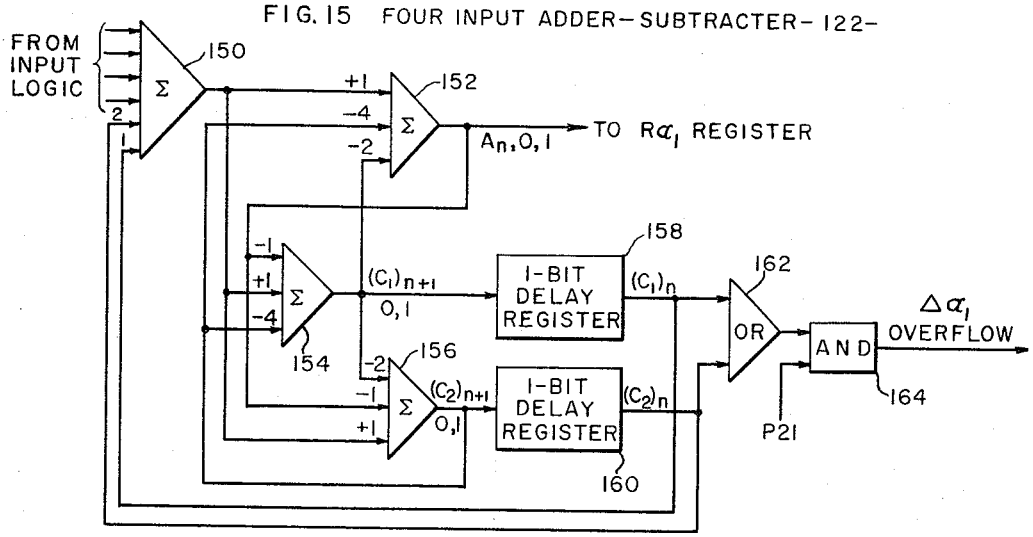
FIG. 15 FOUR INPUT ADDER-SUBTRACTER-122-
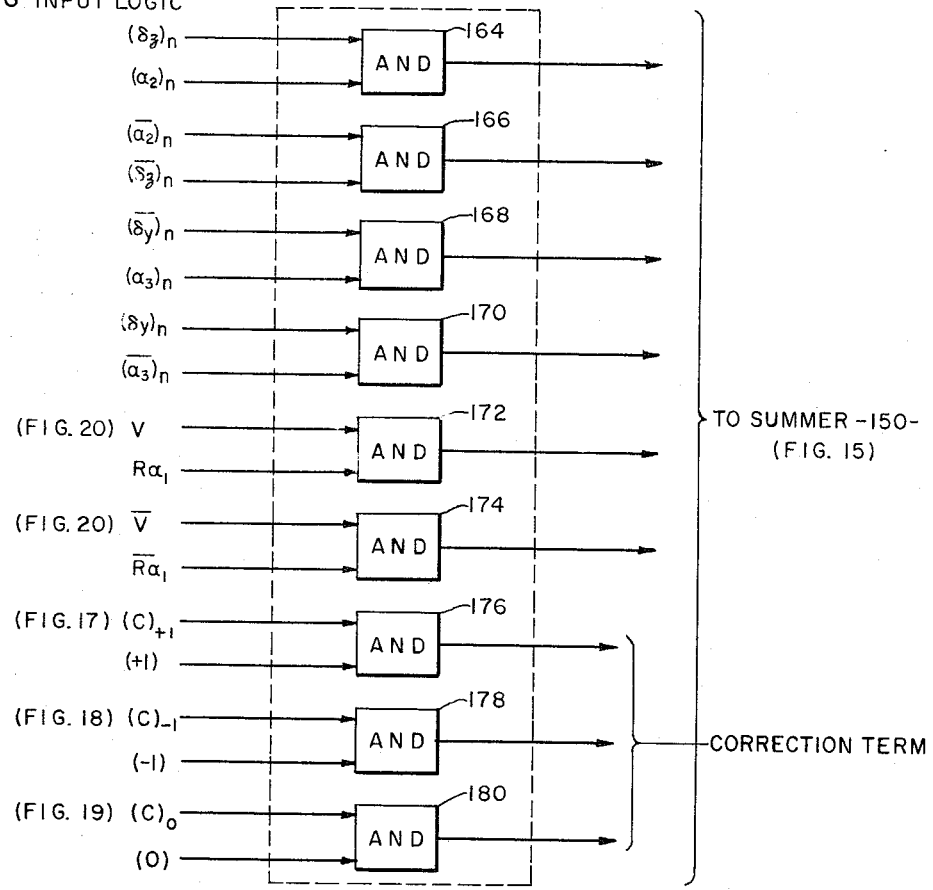
FIG. 16 INPUT LOGIC

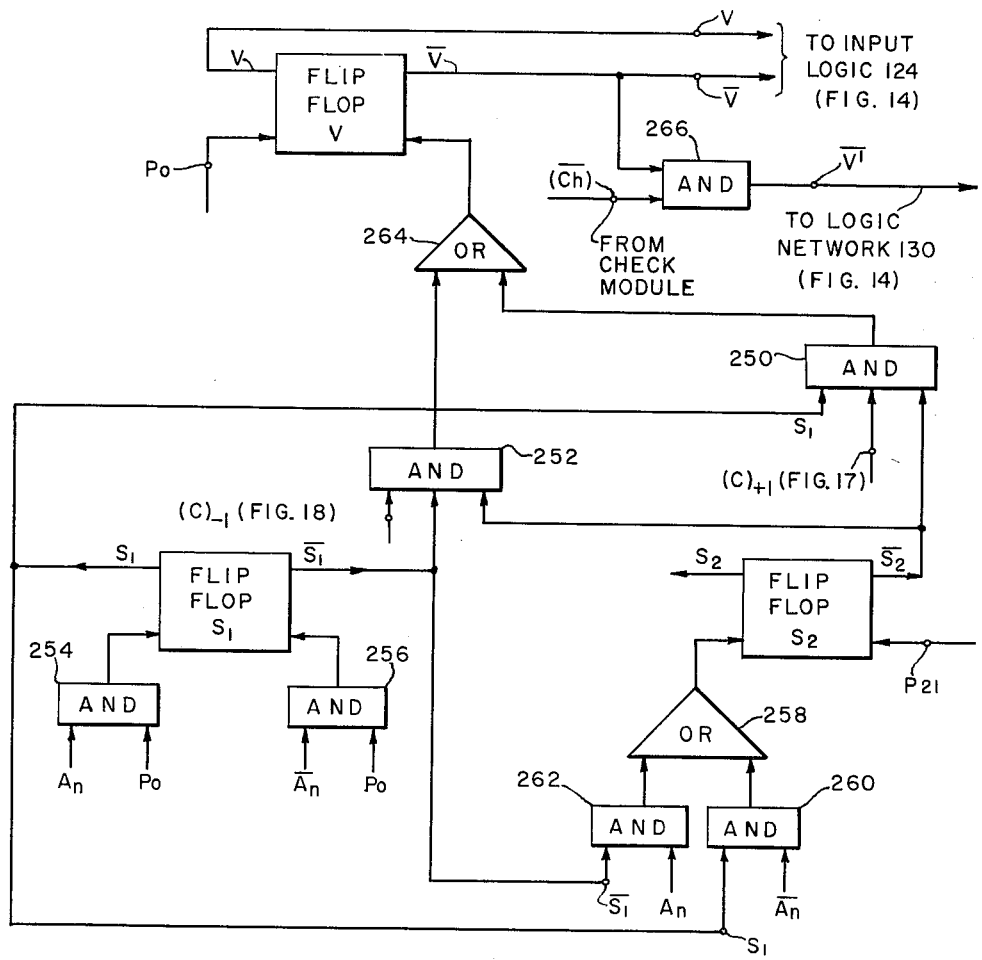
FIG. 20 CRITICAL CONDITION SCANNING LOGIC -128-
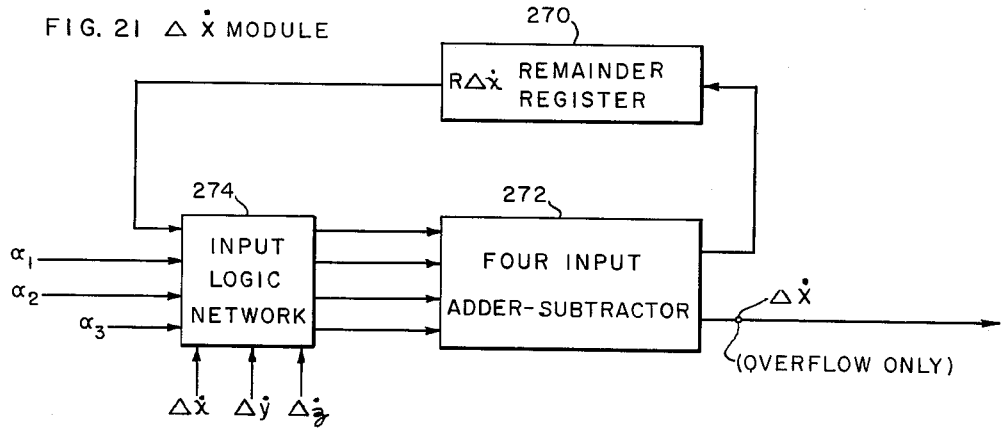
FIG. 21 Δẋ MODULE

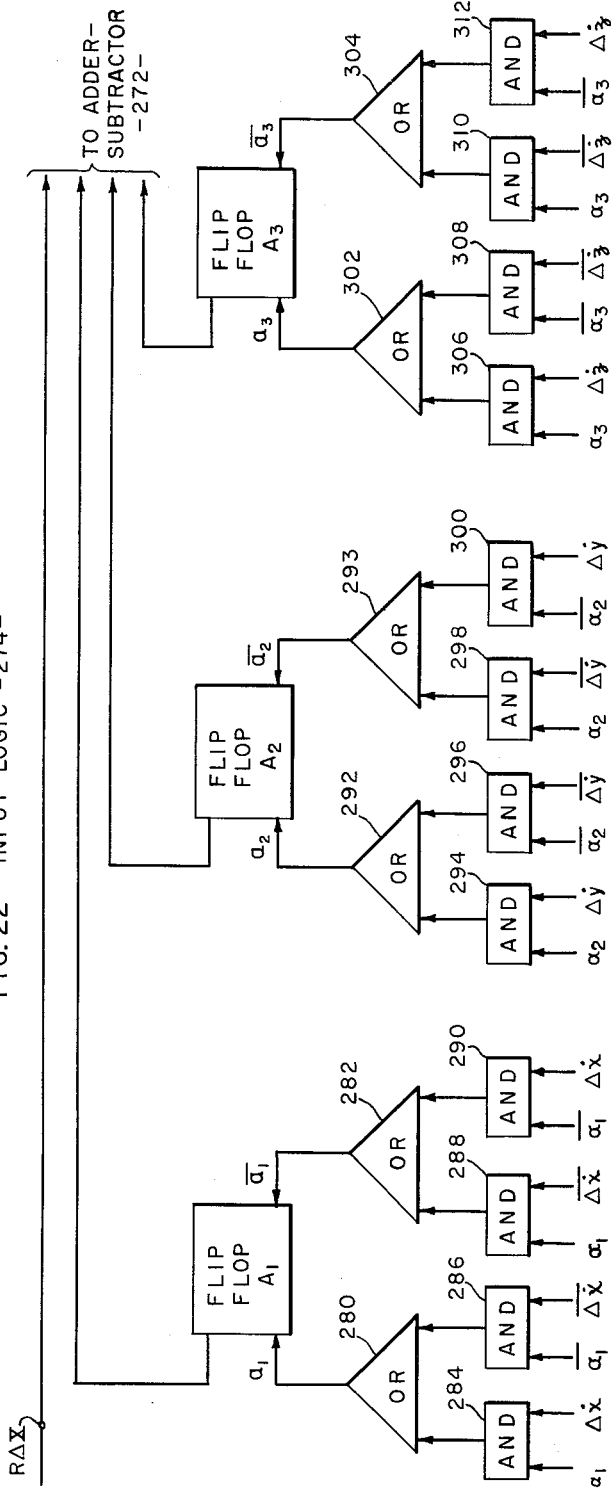
FIG. 22 INPUT LOGIC -274-
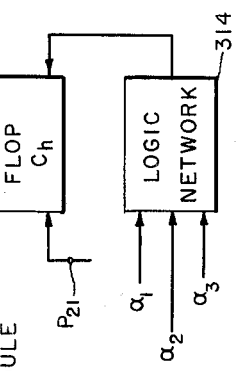
FIG. 23 CHECK MODULE

United States Patent Office 3,231,726
Patented Jan. 25, 1966

3,231,726
COORDINATE CONVERSION SYSTEM FOR STRAP
DOWN INERTIAL GUIDANCE SYSTEMS
Robert R. Williamson, Carlsbad, Calif., assignor to General Precision, Inc., a corporation of Delaware
Filed June 22, 1961, Ser. No. 118,981
9 Claims. (Cl. 235—164)

The present invention relates to coordinate conversion systems, and it relates more particularly to an improved inertial guidance system of the "strap-down" type, which does not require a stable platform, and in which "vehicle-referenced" coordinates are converted to selected-stabilized coordinates by incremental computer means.

Inertial guidance systems are utilized in manned vehicles, such as aircraft, ships and submarines; and in unmanned vehicles, such as missiles, to provide an automatic navigation system for the vehicles. The automatic navigation system functions to sense changes in speed of the vehicle with respect to selected-stabilized axes, and to produce output signals corresponding to such changes. The output signals may be used in the guidance system to initiate appropriate controls for the vehicle so as to guide the vehicle along a predetermined course in space.

Most prior art inertial guidance systems include a stable platform which is gimbal supported to be angularly independent of the vehicle in which the system is mounted. The stable platform of the prior art systems is held angularly fixed in space, so as to provide a stabilized reference for the system.

The stable platform type of prior art inertial guidance system, such as described above, exhibits certain inherent disadvantages due to the mechanical complexity of the stable platform mechanism, and due to the drift tendencies of such platforms. The mechanical structure adds to the size, weight and cost of the guidance system and reduces its reliability.

The present invention provides an inertial guidance system in which inertial measurements as to the change of angular motion of the vehicle are made with respect to selected "vehicle-fixed" axes of the vehicle itself, rather than with respect to a stabilized platform. This is the basis for the term "strap-down" system, since the acceleration sensing instrumentalities and the angular change sensing instrumentalities are mounted directly on the frame of the vehicle itself and are not under the control of a stable platform.

It is, accordingly, an object of the present invention to provide an improved inertial guidance system for a vehicle which is of the strap-down type, and which does not require stabilization by a stable platform, or equivalent instrumentalities.

Another object of the invention is to provide such an improved strap-down inertial guidance system which includes a computer for utilizing signals from the acceleration and rate-of-turn instrumentalities mounted on the frame of the vehicle, and to provide outputs representative, for example, of the vehicle accelerations with respect to selected stabilized axes.

The particular computer to be described in the ensuing description of the invention as suitable for use in the "strap-down" guidance system of the invention, is a transistorized, high speed, modular, incremental computer. The computer operates in conjunction with linear acceleration-sensing instrumentalities and angular rate-sensing instrumentalities, which, as mentioned above, are mounted directly on the frame of the vehicle. The computer provides stabilized signals representing vectors of vehicle acceleration with respect to the axes of a selected stable coordinate system.

The particular incremental computer to be described includes fifteen, similar, serial incremental modules which operate in parallel. A feature of the system to be described is that these modules are freely interchangeable with one another so as to facilitate the construction and service of the computer.

The operating frequency of the incremental computer to be described may be of the order of one megacycle, and it has the capability to exhibit a solution rate of fifty thousand solutions per second. The transistorized computer may be excited directly from a 28 volt battery, and it may operate on approximately 75 watts of power. The computer memory may be composed of 1-word magnetostrictive delay lines. The weight of the computer may be of the order of 5–7 pounds, and its size of the order of 0.1 cubic feet.

In brief, therefore, the principal objects of the present invention are to provide a low cost, light weight, small size, strap-down inertial guidance system which is capable of precisely and accurately transforming measurements in a "vehicle-fixed" coordinate system to values in a "space-stabilized" coordinate system, and which has the ability to cope with relatively large linear and angular accelerations of the vehicle.

The modular approach to the embodiment of the invention to be described is possible due to the particular difference equations selected for solution by the incremental computer. These equations represent the direction cosines of a matrix which resolves the vehicle-fixed coordinates to stabilized coordinates.

The selection of these particular difference equations makes it possible to organize the incremental computer in a straightforward and practical manner into a means for solving three separate and independent, but identical, problems. Therefore, the "strap-down" system of the invention may take the form of three separate, identical computers, operating in parallel. Alternately, the system of the invention may take the form of a single computer which solves the three separate problems on a serial time-shared basis.

When the three separate computers are used, each of the three may be composed of five identical modules, to provide a system made up of fifteen identical modules. When the single computer is used, the solutions required may be derived from five modules operating on a time-shared basis.

The above-mentioned use of identical modules permits interchangeability, which, as noted, facilitates to a large extent the construction and servicing of the computational system. For example, since the modules are mutually interchangeable, all efforts as to reliability, economy, and the like, can be concentrated on a single module; and the benefits of these concentrated efforts can be reflected throughout all the plurality of modules in the computational system by mere duplication.

In addition to the benefits mentioned in the preceding paragraph, the servicing of the module-type computational system is greatly facilitated. This is because the usually required multiplicity of spare parts can be replaced by a few spare modules, and module replacement can substitute prolonged tests for malfunction of the system.

The improved modular type of computational system to be described is also advantageous from a reliability standpoint. This use of identical modules permits redundant modules to be included in the computational system, with an automatic switch-over control being provided for switching a redundant module into the system in the event of a malfunction in any of the operative modules.

The strap-down inertial guidance system to be described is capable, not only of providing all the capabilities of inertial guidance systems, but also for providing inverse resolutions, for example, as needed for the generation of control signals in missile guidance systems.

These ancillary features can be realized by the provision of identical, additional incremental modules in the computational system.

It will also be evident as the description proceeds, and as indicated above, that the inertial guidance system of the invention is not limited to airborne applications, but can find practical use in many different types of vehicles, including land and sea vehicles. In fact, the improved system of the invention can find utility in any application where the precise and efficient conversion from one coordinate system to another is required.

In the drawings:

FIGURE 13 is a schematic showing of the different modules incorporated into the embodiment of the invention to be described herein;

FIGURE 14 is a block representation of the logic and other components included in one of the modules of FIGURE 13;

FIGURE 15 represents suitable logic for an add-subtractor included in the module of FIGURE 14;

FIGURE 16 represents suitable input logic for the module of FIGURE 14;

FIGURE 20 is a logical representation of a system for determining when a register in the module of FIGURE 14 is in a critical condition;

FIGURE 21 is a logical representation of another module for use in the computer of the invention;

FIGURE 22 represents suitable input logic for the module of FIGURE 21; and

FIGURE 23 is a typical representation of a check module used in the computer of the disclosed embodiment of the invention.

Figure 1:
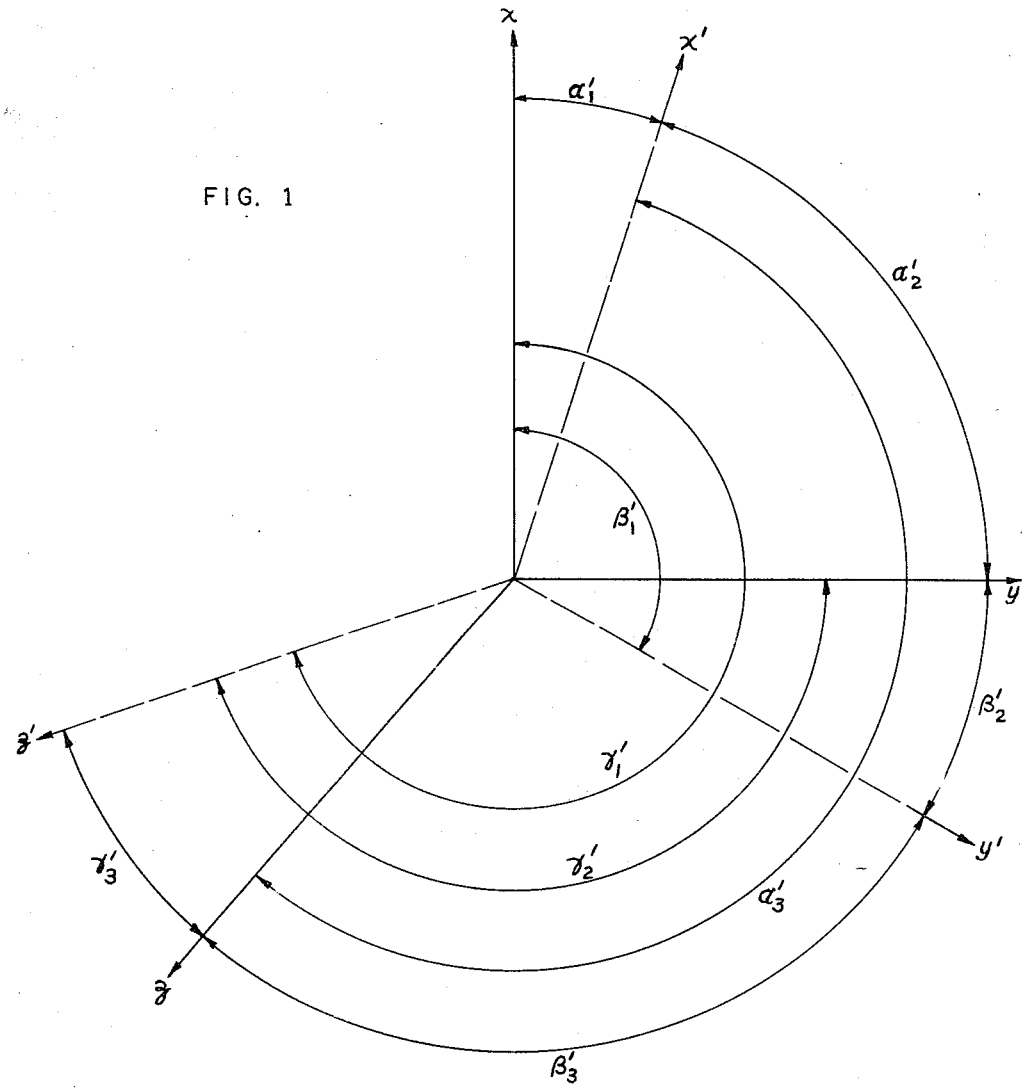
FIGURE 1 is a representation of the vehicle-fixed and stabilized coordinate systems and of the manner in which the direction cosines are resolved.

The computational system of the invention in its broader aspects, as noted above, serves to transform a first coordinate system, such as a "vehicle-fixed" coordinate system, to a second selected-stabilized coordinate system. This transformation, as will be described, is achieved by solving the difference equations representing the direction cosines between the vehicle-referenced coordinate system and the selected stabilized coordinate system.

In order that the system of the invention may perform the coordinate transformation referred to in the preceding paragraph, signals representing the total angular rate of the vehicle-fixed coordinate system with respect to the stabilized system, are input to the system. Further signals representing the accelerations of the vehicle with respect to the vehicle-fixed coordinate system are introduced to the computational system. The resulting computed outputs are representative, for example, of the vehicle acceleration vectors with respect to the selected-stabilized coordinate system.

It is evident that in order to preclude the necessity of orienting the vehicle itself prior to launching to a particular initial position corresponding to the pre-selected coordinate system in space, signals representative of certain initial conditions must be fed into the computational system of the invention. Then, the actual transformation performed by the system of the invention will be with respect to a pre-selected stabilized coordinate system.

The initial condition settings referred to above are equivalent to the initial adjustments of the stable platform in the prior art stabilized platform type of initial guidance system. In the prior art stable platform type of initial guidance system, the stable platform is initially set to a pre-determined position by the introduction of torquing signals to its gimbal-controlled servo mechanism. These torquing signals serve, for example, to set the platform to a pre-determined heading and attitude prior to launching. However, the initial condition setting signals can be introduced instantaneously into the system of the invention, and no "warm up" period is required, as is the case with the prior art stable platform systems.

Because of this "warm-up" factor, the prior art stable platform type of guidance system is unsuitable for use in missiles, and the like, which must be kept at the "ready" for prolonged intervals of time. Such missiles must be in such as operative condition, that upon the appropriate signal, they may be instantaneously launched. However, the amount of time normally required to adjust the stable platform of the prior art guidance system to its initial condition is relatively long. This means that for instantaneous readiness, the prior art stable platform must be set and ready in the prior art guidance system which, in turn, means that the torquing signals must be continuously applied thereto and the whole mechanism must be actually in mechanical operation. This, of course, is impractical over prolonged periods of time.

As described above, the computation system of the present invention usually must also have certain initial conditions preset into it. This pre-setting of the system of the invention, as also described above, is to permit the coordinate transformation to be effectuated with respect to a selected stabilized coordinate system. For example, an appropriate stabilized coordinate system would be an earth-centered system.

In the case of the computational system of the present invention, the initial conditions are pre-set into the system merely by introducing signals representative of certain digital numbers. These numbers are computed on the basis of the relationship between the location and orientation of the particular vehicle and the different axes of the selected fixed coordinate system. The initial setting signals can be introduced instantaneously into the computational system of the invention at the moment of launching.

Therefore, the system of the present invention is ideal for use in missiles, and the like, since it can be maintained ready for instantaneous use; without the need for activating mechanically movable parts over prolonged periods of time, as would be the case with the prior art stable platform systems.

The inertial sensors to be used in the system of the invention, as applied to inertial guidance, include, for example, a group of three accelerometers for sensing linear accelerations along three axes which are fixed with respect to the vehicle; and a group of three rate gyros for sensing angular rates about the three vehicle-fixed axes. The computer included in the guidance system readily accepts pulse type information, and for that reason, the outputs of the rate gyros and of the accelerometers should preferably have a digital incremental form.

Inertial sensors of the incremental digital type are described, for example, in the Handbook of Astronautical Engineering, Koelle, McGraw-Hill Publishing Company, First edition, 1961 (13–3). Reference is also made to "Computer Handbook," Husky and Korn, McGraw-Hill Publishing Company, 1962 (19–55).

As noted above, the system of the invention may be composed of three separate incremental computers all operating in parallel to solve the three separate, but identical, problems. When this parallel approach is used, fifteen serial-incremental modules are used. Nine of these modules are used to generate the direction cosines; three are used to multiply the direction cosines with representative measured accelerations to form the stabilized components of acceleration; and three serve as check modules to assure that there are no erroneous variations in the respective magnitudes of the three vectors.

As also noted, the system of the invention may be composed of a single incremental computer which solves the three problems in a serial time-shared manner. This computer would be composed of five modules, three being used to generate the direction cosines in a serial manner; one being used serially to multiply each direction cosine with the corresponding acceleration; and one being used in a serial manner as the check module.

The basic equations to be solved by the computational system of the invention may be derived as follows:

In FIGURE 1, the axes $x$, $y$ and $z$ are intended to represent the axes of the vehicle-fixed coordinate system; and the axes $x'$, $y'$ and $z'$ are intended to represent the axes of the stabilized coordinate system.

If the unit vectors along the vehicle-fixed axes are represented respectively by $$\vec{l}_{x'}, \vec{l}_{y'} \text{ and } \vec{l}_{z'}$$

$$\dot{\alpha}_1 \vec{l}_x + \dot{\alpha}_2 \vec{l}_y + \dot{\alpha}_3 \vec{l}_z = -\vec{\omega}_x \vec{l}_{x'}$$

and if the unit vectors along the stabilized axes be represented respectively as $$\vec{l}_{x'}, \vec{l}_{y'}, \vec{l}_{z'}$$

then, $$\vec{l}_{x'} = \alpha_1 \vec{l}_x + \alpha_2 \vec{l}_y + \alpha_3 \vec{l}_z$$

$$\vec{l}_{y'} = \beta_1 \vec{l}_x + \beta_2 \vec{l}_y + \beta_3 \vec{l}_z$$

$$\vec{l}_{z'} = \gamma_1 \vec{l}_x + \gamma_2 \vec{l}_y + \gamma_3 \vec{l}_z$$

In the above equations, and with reference to FIGURE 1

$\alpha_1 = \cos \alpha_1'$
$\alpha_2 = \cos \alpha_2'$
$\alpha_3 = \cos \alpha_3'$
$\beta_1 = \cos \beta_1'$
$\beta_2 = \cos \beta_2'$
$\beta_3 = \cos \beta_3'$
$\gamma_1 = \cos \gamma_1'$
$\beta_3 = \cos \beta_3'$
$\gamma_1 = \cos \gamma_1'$
$\gamma_2 = \cos \gamma_2'$
$\gamma_3 = \cos \gamma_3'$ The terms $\alpha_1$, $\alpha_2$, $\alpha_3$, $\beta_1$, $\beta_2$, $\beta_3$, $\gamma_1$, $\gamma_2$, $\gamma_3$ will be referred to in the following description as the direction cosines.

The rate gyros of the system, as mentioned above, and as will be described in more detail, provide instantaneous angular velocity readings about the three vehicle-fixed axes $x$, $y$, $z$. These angular velocities will be represented as $\omega_x$, $\omega_y$, $\omega_z$, respectively. Since the stabilized coordinate system is fixed in space, the angular velocity $\vec{\omega}$ between the vehicle-fixed coordinate system and the stabilized coordinate system will be the vector sum of the measured angular velocities. That is:

$$\vec{\omega} = \omega_x \vec{l}_x + \omega_y \vec{l}_y + \omega_z \vec{l}_z \quad (1)$$

The time derivative of the unit vector $$\vec{l}_{x'}$$

of the stabilized coordinate system is $$\left[\frac{d\vec{l}_{x'}}{dt}\right]_D = \left[\frac{d\vec{l}_{x'}}{dt}\right]_M + \vec{\omega}_x \vec{l}_{x'} \quad (2)$$

where the subscripts D and M denote with respect to the space-stabilized and vehicle-fixed coordinate systems, respectively. But, by definition, the term $$\vec{l}_{x'}$$

is a unit vector. Therefore:

$$\left[\frac{d\vec{l}_{x'}}{dt}\right]_D = 0 \quad (3)$$

also $$\left[\frac{d\vec{l}_{x'}}{dt}\right]_M = \dot{\alpha}_1 \vec{l} + \dot{\alpha}_2 \vec{l}_y + \dot{\alpha}_3 \vec{l}_z \quad (4)$$

where $\dot{\alpha}_1$ is the rate of change of the direction cosine $\dot{\alpha}_1$;
$\dot{\alpha}_2$ is the rate of change of the direction cosine $\dot{\alpha}_2$;
$\dot{\alpha}_3$ is the rate of change of the direction cosine $\dot{\alpha}_3$;

Therefore:

$$= (\omega_z \alpha_2 - \omega_y \alpha_z) \vec{l}_x + (\omega_x \alpha_3 - \omega_z \alpha_1) \vec{l}_y + (\omega_y \alpha_1 - \omega_x \alpha_2) \vec{l}_z \quad (5)$$

Equation 5 yields the first three basic equations $$\dot{\alpha}_1 = \alpha_2 \omega_z - \alpha_3 \omega_y \quad (6)$$

$$\dot{\alpha}_2 = \alpha_3 \omega_x - \alpha_1 \omega_z \quad (7)$$

$$\dot{\alpha}_3 = \alpha_1 \omega_y - \alpha_2 \omega_x \quad (8)$$

Similar derivatives $$\vec{l}_{y'} \text{ and } \vec{l}_{z'}$$

give the remaining basic equations:

$$\dot{\beta}_1 = \beta_2 \omega_z - \beta_3 \omega_y \quad (9)$$

$$\dot{\beta}_2 = \beta_3 \omega_x - \beta_1 \omega_z \quad (10)$$

$$\dot{\beta}_3 = \beta_1 \omega_y - \beta_2 \omega_x \quad (11)$$

$$\dot{\gamma}_1 = \gamma_2 \omega_z - \gamma_3 \omega_y \quad (12)$$

$$\dot{\gamma}_2 = \gamma_3 \omega_x - \gamma_1 \omega_z \quad (13)$$

$$\dot{\gamma}_3 = \gamma_1 \omega_y - \gamma_2 \omega_x \quad (14)$$

The measured components of the accelerations along the three axes of the vehicle-fixed coordinate system may be represented as $\Delta \ddot{x}(t)$, $\Delta \ddot{y}(t)$, $\Delta \ddot{z}(t)$.

The system of the invention provides output signals representative of the components of these accelerations in inertial stabilized coordinates, as referenced to the stabilized coordinate system. These latter components are represented as $\Delta \dot{X}(t)$, $\Delta \dot{Y}(t)$, $\Delta \dot{Z}(t)$.

The latter components are obtained by the rotation operation $$\begin{vmatrix} \Delta \dot{X} \\ \Delta \dot{Y} \\ \Delta \dot{Z} \end{vmatrix} = \begin{pmatrix} \alpha_1 \alpha_2 \alpha_3 \\ \beta_1 \beta_2 \beta_3 \\ \gamma_1 \gamma_2 \gamma_3 \end{pmatrix} \begin{vmatrix} \Delta \dot{x} \\ \Delta \dot{y} \\ \Delta \dot{z} \end{vmatrix} \quad (15)$$

where the $\alpha$, $\beta$ and $\gamma$'s are the instantaneous values of the direction cosines.

It is, therefore, necessary first to complete the direction cosines from the basic Equations 6–14, and then to compute the sums $\Delta \dot{x}$, $\Delta \dot{y}$, $\Delta \dot{z}$.---

$$\Delta \dot{X} = \alpha_1 \Delta \dot{x} + \alpha_2 \Delta \dot{y} + \alpha_3 \Delta \dot{z} \quad (16)$$
$$\Delta \dot{Y} = \beta_1 \Delta \dot{x} + \beta_2 \Delta \dot{y} + \beta_3 \Delta \dot{z} \quad (17)$$
$$\Delta \dot{Z} = \gamma_1 \Delta \dot{x} + \gamma_2 \Delta \dot{y} + \gamma_3 \Delta \dot{z} \quad (18)$$

Figure 2:
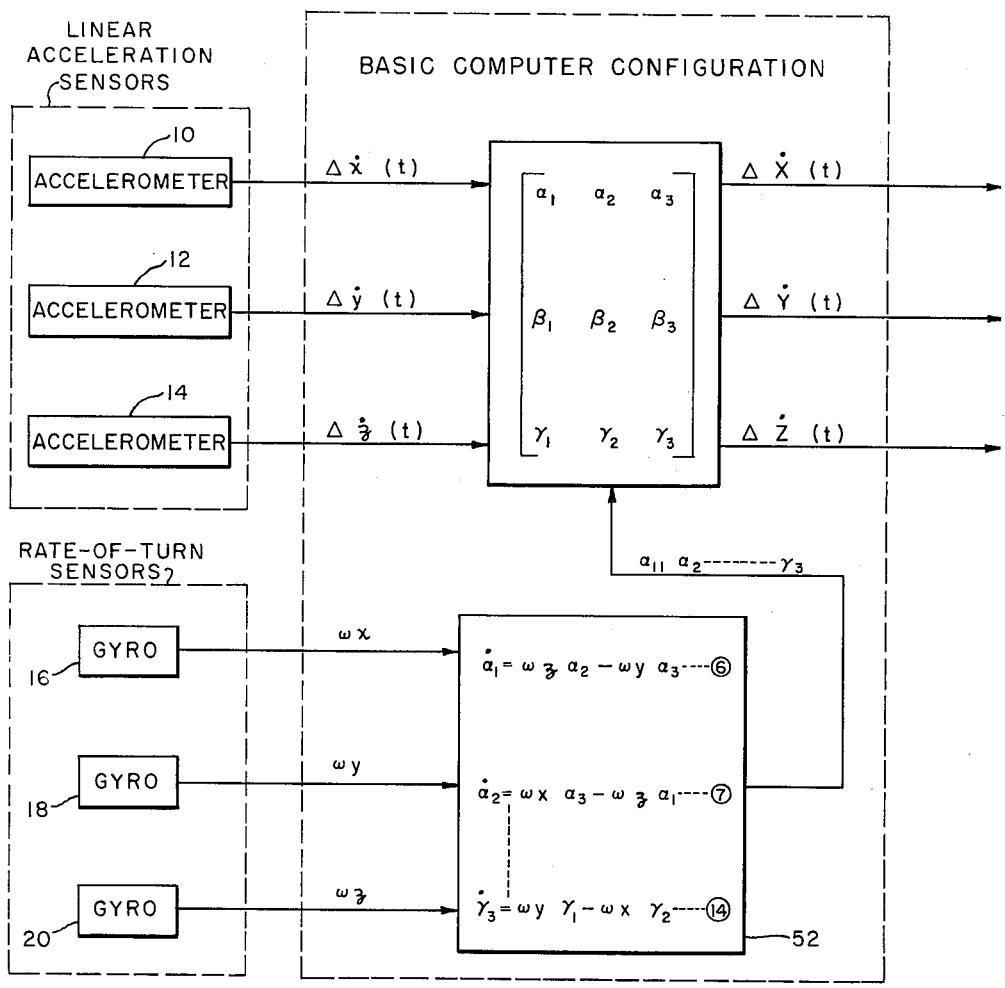
FIGURE 2 is a schematic block diagram of one embodiment of the system of the invention.

An inertial guidance system embodying one embodiment of the invention is illustrated schematically in FIGURE 2. The basic computer configuration illustrated therein includes a block 50 and a block 52. The linear acceleration sensors are represented by three accelerometers, which, in turn, are represented by the blocks 10, 12 and 14. These accelerometers, as mentioned above, are mounted to measure accelerations along the vehicle-fixed axes, and they are orthogonally related to one another. As noted above, the accelerometers are preferably of the incremental digital type, so that outputs may be directly used by the incremental computer of the system. As also mentioned above, this type of accelerometer is described, for example, in Section 13–3 of the Handbook of Astronautical Engineering, Koelle.

The system of the embodiment of the invention under consideration also includes a group of rate-of-turn sensors, which, in turn, are represented by three gyros 16, 18 and 20. These gyros are shown in block form, as they can have any suitable known construction. The gyros 16, 18 and 20 measure the rate of turn of the vehicle about the three vehicle-fixed axes $x$, $y$ and $z$. These gyros, likewise, are preferably of the incremental digital type, so that their outputs can be used directly by the incremental computer of the system. The digital output of the gyro may be formed in the manner described in Section 13–3 of the Handbook of Astronautical Engineering, Koelle, referred to above.

As illustrated in FIGURE 2, the accelerometers 10, 12 and 14 produce the terms $\Delta \dot{x}$, $\Delta \dot{y}$, $\Delta \dot{z}$, respectively; whereas the gyros 16, 18 and 20 produce the terms $\omega_x$, $\omega_y$ and $\omega_z$, respectively. The computer block 52 responds to these latter terms to compute the nine direction cosines $\alpha_1$, $\alpha_2$, $\alpha_3$; $\beta_1$, $\beta_2$, $\beta_3$; and $\gamma_1$, $\gamma_2$, $\gamma_3$. The direction cosine terms are introduced to the block 50 which sums these terms with the acceleration terms, in a manner to be described to produce the desired outputs.

The resulting outputs from the computer include signals representing the terms $\Delta \dot{X}$, $\Delta \dot{Y}$, $\Delta \dot{Z}$. These output terms are representative of the acceleration of the vehicle, as referenced to the selected space-stabilized display coordinate system.

Many approaches to the computation of the directional cosines appear to be reasonable when first examined. However, most of these approaches have proven to be impractical for many reasons. For example, many of the approaches require an excessive amount of equipment, and many involve the generation of intermediate variables which have ranges extending to ±infinity, which, in turn, create scaling and rate problems.

At present, the preferred mathematical approach is one in which the direction cosines are derived directly, rather than by the generation of intermediate variables. The basic differential Equations 6–14 are not suitable for implementation by an incremental computer. The approach of the present invention therefore, is based on difference equations, rather than differential equations; which difference equations are susceptible to implementation by incremental computers. The following discussion will be based initially on a two-dimensional system, rather than a three-dimensional, for simplicity purposes.

Figure 3:
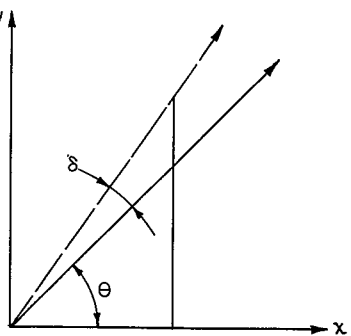
FIGURE 3 is an action diagram illustrating an angular increment in a two-dimensional system and which is useful in explaining the present invention.

Consider, for example, the generation of the direction cosines in a two-dimensional system. Such a generation involves, in fact, the generation of the sine and cosines of the changing angle $\theta$ in FIGURE 3. Assume now that by the two successive solutions by the computer the angle $\theta$ has changed by an increment $\delta$. The exact difference equations are obtained from the following:

$$\Delta \sin \theta = \sin (\theta + \delta) - \sin \theta = [\sin \theta \cos \delta + \cos \theta \sin \delta] - \sin \theta \quad (19)$$
$$\Delta \cos \theta = \cos (\theta + \delta) - \cos \theta = [\cos \theta \cos \delta - \sin \theta \sin \delta] - \cos \theta \quad (20)$$

The exact difference equations are, therefore:

$$\Delta \sin \theta = \sin \theta (\cos \delta - 1) + \cos \theta \sin \delta \quad (21)$$
$$\Delta \cos \theta = \cos \theta (\cos \delta - 1) + \sin \theta \sin \delta \quad (22)$$

The approximations made in implementing the Equations 21 and 22 by the computer are:

$$\Delta \sin \theta = \cos \theta (\delta) \quad (23)$$
$$\Delta \cos \theta = -\sin \theta (\delta) \quad (24)$$

Therefore, these approximations are in error by:

$$\epsilon(\Delta \sin \Theta) = \sin \Theta(\cos \delta - 1) + \cos \Theta(\sin \delta - \delta) \quad (25)$$
$$\epsilon(\Delta \cos \Theta) = \cos \Theta(\cos \delta - 1) - \sin \Theta(\sin \delta - \delta) \quad (26)$$

with $\delta$ small, to its second order, we have:

$$\epsilon(\Delta \sin \theta) = -\frac{\delta^2}{2} \sin \theta \quad (27)$$

$$\epsilon(\Delta \cos \theta) = -\frac{\delta^2}{2} \cos \theta \quad (28)$$

The Equations 27 and 28 show that the error is independent of the sign of $\delta$. That is, the error is cumulative for each computer solution; and the error is not self-compensating should the angle $\delta$ change opposite directions during the successive solutions.

The characteristics of the above-discussed inherent errors can also be demonstrated by taking the approximate Equations 23 and 24, namely:

$$\Delta S = C \delta$$
$$\Delta C = -S \delta$$

Then, the $(n+1^{\text{th}})$ solution made by the computer is $$S_{n+1} - S_n = C_n \delta \quad (29)$$
$$C_{n+1} - C_n = -S_n \delta \quad (30)$$

The Equations 29 and 30, re-arranged, yield the following equations in matrix form:

$$\begin{vmatrix} S_{n+1} \\ C_{n+1} \end{vmatrix} = \begin{pmatrix} 1 & \delta \\ -\delta & 1 \end{pmatrix} \begin{vmatrix} S_n \\ C_n \end{vmatrix} \quad (31)$$

Figure 4:
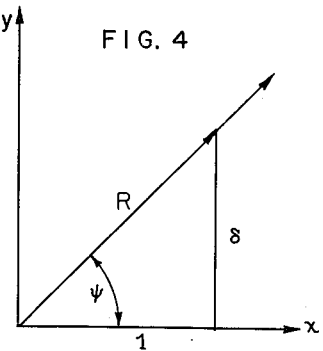
FIGURE 4 is a vector representation of an inherent error in the incremental generation of sines and cosines, and which error is eliminated in the system of the invention.

Now, if we let $R \cos \psi = 1$, and $R \sin \psi = \delta$, so that $$R = (1 + \delta^2)^{1/2}$$

and $\psi = \tan^{-1} \delta$, as shown in FIGURE 4, then:

$$\begin{vmatrix} S_{n+1} \\ C_{n+1} \end{vmatrix} = \begin{pmatrix} R \cos \psi & \sin \psi \\ -R \sin \psi & R \cos \psi \end{pmatrix} \begin{vmatrix} S_n \\ C_n \end{vmatrix}$$

$$= |R| \begin{pmatrix} \cos \psi & \sin \psi \\ -\sin \psi & \cos \psi \end{pmatrix} \begin{vmatrix} S_n \\ C_n \end{vmatrix} \quad (32)$$

The above equations show that if the vector swings through an angle $\delta$ for a particular solution, the computer actually treats the swing as through an angle $\psi = \tan^{-1} \delta$. Also, for each solution, the vector magnitude instead of being constant, increases in accordance with the relationship $R = (1 + \delta^2)^{1/2}$.

Then, after $n$ steps in the same direction, we have:

$$\begin{vmatrix} S_n \\ C_n \end{vmatrix} = (1 + \tan^2 \psi)^{1/2} \begin{pmatrix} \cos n\psi & \sin n\psi \\ -\sin n\psi & \cos n\psi \end{pmatrix} \begin{vmatrix} So \\ Co \end{vmatrix} \quad (33)$$

The first source of error, due to the fact that $\tan^{-1} \delta$ is considered by the computer as being equal to $\delta$, is not serious. This is because the first source of error still corresponds to a rotation and amounts only to a minor scale change on the angle. However, the successive increase in amplitude of the vector for each successive solution is a serious source of error.

Figure 5:
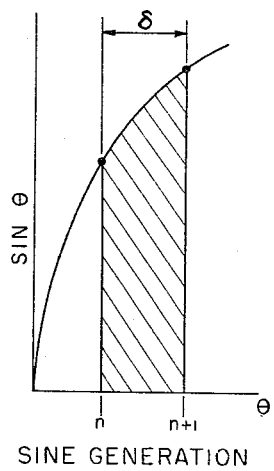
FIGURE 5 is a schematic representation of the box-car incremental generation of a sine.
Figure 6:
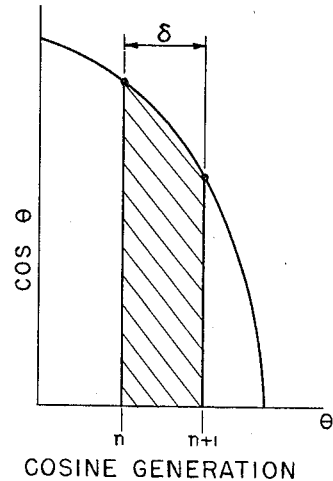
FIGURE 6 is the schematic representation of the box-car incremental generation of a cosine.

The incremental computer generation of sines and cosines is illustrated schematically in FIGURES 5 and 6. As shown, should the angle $\Theta$ change between the $n^{th}$ and $n+1^{th}$ solution by an amount $\delta$, the sine $\Theta$ increment is generated in accordance with the equation $S_{n+1}-S_n=C_n\delta$, and the increment is added to the previous sine $\Theta$ value. Likewise, the cosine increment is generated in accordance with the equation $C_{n+1}-C_n=-S_n\delta$ and added to the previous cos $\Theta$ solution.

The sine and cosine generations described in the preceding paragraph, as mentioned above, give rise to an error which may be represented by a vector and which vector rotates from solution to solution and grows for each successive solution.

Figure 7:
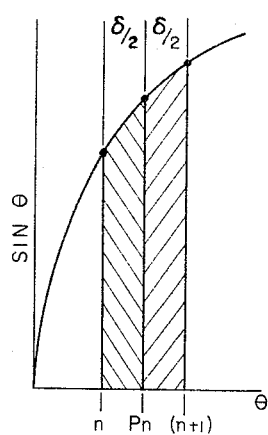
FIGURE 7 is a schematic representation of the trapezoidal incremental generation of a sine.
Figure 8:
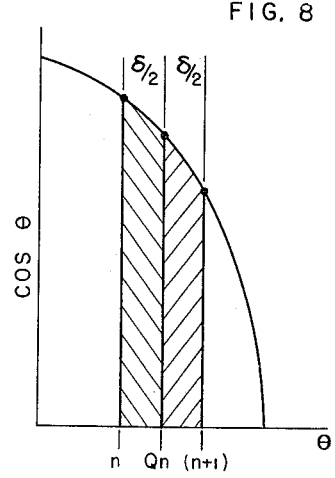
FIGURE 8 is a schematic representation of the trapezoidal incremental generation of a cosine.

The error vector growth can be eliminated in the following manner. There is an intermediate solution $P_n$, $Q_n$, such as shown in FIGURES 7 and 8, which is midway between the previous $n^{th}$ and $n+1^{th}$ solutions. For the intermediate solution $$\begin{vmatrix} P_n \\ Q_n \end{vmatrix} = \begin{pmatrix} 1-\frac{\delta}{2} \\ \frac{\delta}{2}1 \end{pmatrix} \begin{vmatrix} S_{n+1} \\ C_{n+1} \end{vmatrix} \quad (34)$$

$$= \begin{pmatrix} 1\frac{\delta}{2} \\ -\frac{\delta}{2}1 \end{pmatrix} \begin{vmatrix} S_n \\ C_n \end{vmatrix} \quad (35)$$

Therefore, if for an $\Theta$ change of $\delta$ we solve to an intermediate point $$\frac{S}{2}$$

we have an intermediate error vector which has a magnitude R which is $$\left(1+\frac{\delta^2}{4}\right)^{1/2}$$

times the magnitude of the error vector of the $n^{th}$ and $n+1^{th}$ solution points. Therefore, the error vector at the $n+1^{th}$ point must be the same as the error vector at the $n^{th}$ point, when the solution is taken at the $P_nQ_n$ points, so that error vector growth is eliminated.

Furthermore, since the intermediate error vector is rotated backwards from the $n+1^{th}$ point and forward from the $n^{th}$ point by an amount $$\psi=\tan^{-1}\frac{\delta}{2}$$

then the $n+1^{th}$ vector must be rotated forward from the $n^{th}$ vector by an amount $$2\tan^{-1}\frac{\delta}{2}$$

This latter term is a better approximation to $\delta$ than $\tan^{-1}\delta$. The resulting equations are:

$$S_{n+1}-\frac{\delta}{2}C_{n+1}=S_n+\frac{\delta}{2}C_n \quad (36)$$

$$\frac{\delta}{2}S_{n+1}+C_{n+1}=\frac{\delta}{2}S_n+C_n \quad (37)$$

for $$\Delta S_{n+1}=\frac{C_{n+1}+C_n\delta}{2} \quad (38)$$

$$\Delta C_{n+1}=\frac{S_{n+1}+S_n\delta}{2} \quad (39)$$

Equations 38 and 39 would appear to indicate that trapezoidal integration, rather than box-car integration, be used to avoid the above-mentioned errors. These equations, however, raise problems, because we cannot compute $C_{n+1}$ until we have computed $S_{n+1}$, but we cannot compute $S_{n+1}$ until we have computed $C_{n+1}$. It would appear, therefore, that older values must be used in one or the other of the Equations 38 and 39.

At this point it is appropriate to discuss briefly the manner in which the basic mathematics of the problem are handled by the incremental computer in the system of the invention. For simplicity, the operation will first be explained on the basis of the two-dimensional system described above.

An incremental computer is composed mainly of sets of units which perform an integrating function. The basic summing unit may be considered as including an accumulator, or remainder, register R (FIGURE 9), and an addend register Y, together with means for adding the contents of these registers.

The addition occurs each time a pulse is applied to the line marked $\Delta x$. As the number in the addend register Y is repeatedly added to the number in the remainder register R, the remainder register will overflow from time to time. Each time an overflow occurs, a pulse will appear on the output line from the remainder register, designated $\Delta z$. The rate at which overflow occurs from the remainder register R depends upon the magnitude of the number in the addend register Y, and in the effective size of the remainder register R.

Therefore, the relationship between the number of $\Delta z$ pulses and $\Delta x$ pulses will be $$\Delta z = \frac{(y)}{2^k}\Delta x$$

where $2^k$ equals the magnitude of the maximum number held in the remainder register R when overflow occurs and $y$ is the number held in the addend register Y.

It will be understood, of course, that the numbers in the registers R and Y will be in binary digital form. If the $\Delta z$ pulses are summed in a third register, the integral of the right hand side is obtained. The coefficient $2^{-k}$ may be considered to be a scale factor in the integration.

In the problem under consideration, the operation is such that during each compute cycle, a single positive or negative $\Delta y$ pulse will be added to the number $y$ in the addend register Y, and a single positive or negative $\Delta x$ pulse will affect addition or subtraction.

In general, it is desirable to allow the number $y$ in the addend register Y to increase or decrease. Since the $\Delta y$ input of one integrator unit may be obtained from the $\Delta z$ output of another, some means must be provided for causing $\Delta z$ to indicate a subtraction. This would imply a ternary number system where $\Delta z$ might be 0, $-1$, or $+1$. Since a binary number system is to be used, $\Delta z$ values $-1$ and $+1$ only will occur. Therefore, a one overflow on the $\Delta z$ line will mean $+1$, while the absence of an overflow (O) will be interpreted as $-1$.

The number system which accomplishes the operation described in the preceding paragraph operates in the following manner: a zero in the addend register Y is represented by a one at the sign digit position followed by zeroes. If zero represented in this way is repeatedly added to the remainder register R, the remainder register will overflow on each alternate addition operation. The $\Delta z$ output, when applied as an input to another summing device, will therefore cause alternate additions and subtractions to take place with a net effect of zero. However, if the number $y$ in the addend register Y is some positive quantity, the remainder register R will overflow more often than not, with the result that more additions than subtractions will be signalled. When the number in the addend register Y is negative, a zero will appear in the sign digit position and the number will be in complement form.

Figure 9:
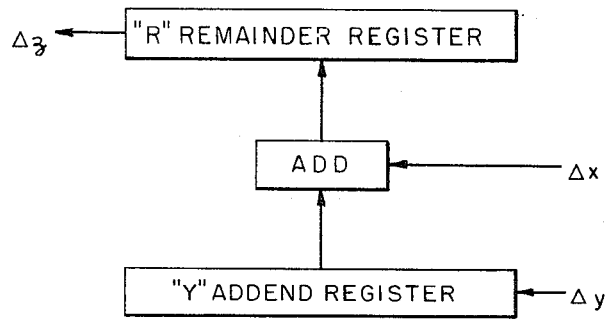
FIGURE 9 illustrates schematically a basic incremental computer unit.

The basic incremental computer of FIGURE 9 as adapted for solving the two dimensional sine-cosine problem described above, is shown in FIGURES 10 and 11. In these figures, the cosine ($C_n$) at the W solution point is stored in the addend register Y of FIGURE 11 and in the remainder register R of FIGURE 10, the most significant digits being in the former and the least significant in the latter. In like manner, the sine ($S_n$) at the N solution point is stored in the addend register Y of FIGURE 10 and in the remainder register R of FIGURE 11, the most significant digits being in the former and the least significant digits being in the latter.

Figure 10:
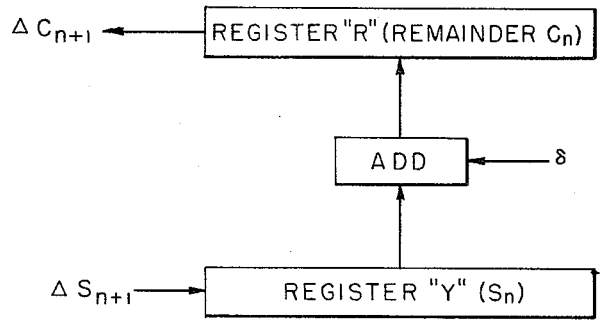
FIGURES 10 and 11 illustrate schematically the basic incremental computer unit as applied to the system of the invention.
Figure 11:
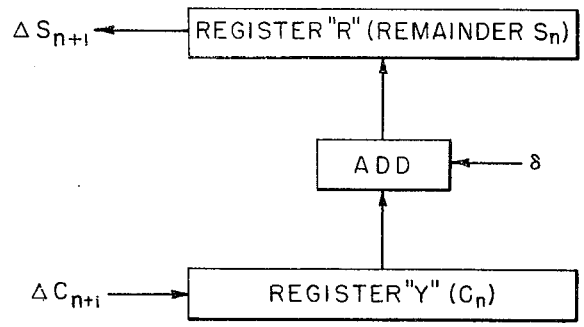

The angle increments $\delta$ are introduced to the add networks in FIGURES 10 and 11. After each solution $n$, the $n+1$ increments appear at the outputs of the R registers. It will be remembered that these outputs occur as a one for overflow, and as a zero for no overflow. The respective outputs are applied to the corresponding addend registers Y.

Figure 12:
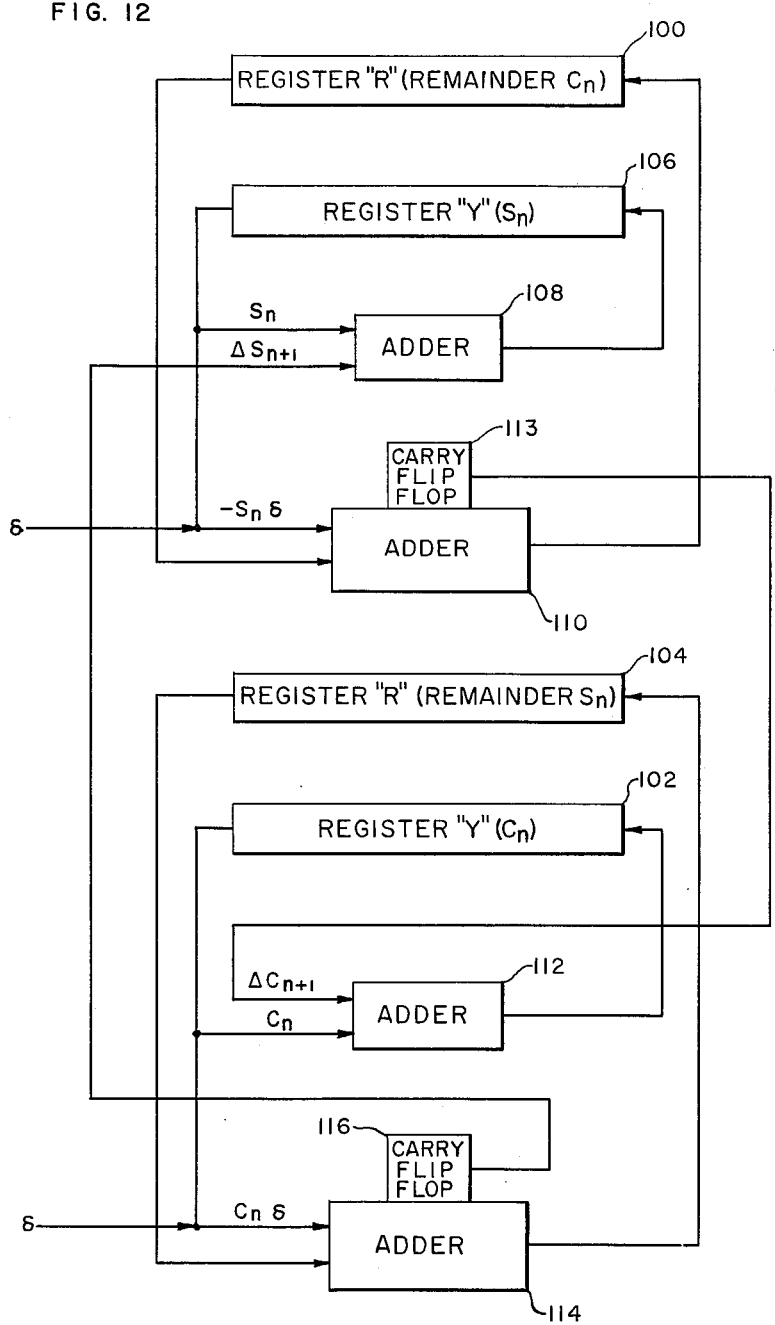
FIGURE 12 is a more complete block representation of the incremental computer units applied to the system of the invention.

A more complete representation of a pair of incremental computer units, corresponding to the units of FIGURES 10 and 11, is shown in FIGURE 12. The system of FIGURE 12 includes a first remainder register 100 for storing the least significant digits $C_n$, and it includes an addend register 102 for storing the most significant digits $C_n$. The system of FIGURE 12 also includes a remainder register 104 for storing the least significant digits $S_n$, and it includes an addend register 106 for storing the most significant digits $S_n$.

The system of FIGURE 12 also includes an adder 108 whose output is coupled to the input of the register 106, and it includes an adder 110 whose output is applied to the input of the register 100. The adder 110 includes a carry flip-flop 113, and the carry flip-flop indicates at the end of each compute cycle whether or not an overflow has occurred from the remainder register 100.

In like manner, the system includes an adder 112 which is coupled to the input of the addend register 102, and the system includes an adder 114 which is coupled to the input of the remainder register 104. A carry flip-flop 116 included in the circuitry of the adder 114 indicates whether or not an overflow has occurred from the remainder register 104.

The contents of the addend register 106 are circulated through the adder 108, and a "1" is added or subtracted from the contents, depending upon the state of the carry flip-flop 116. The contents of the remainder register 100 are circulated through the adder 110, and appropriate logic derives the term $-S_n\delta$ so that the desired integration is performed by the circuitry of the register 100.

Likewise, the contents of the addend register 102 are circulated through the adder 112, and a $+1$ or $-1$ is added to the contents as determined by the state of the flip-flop 113.

The contents of the remainder register 104 are circulated through the adder 114, and appropriate logic is provided for introducing the term $C_n\delta$ to the adder so that the desired integration may be performed.

In the incremental generator $$S_{n+1} = S_n \pm 2^{-k} = S_n + i_s \quad (40)$$
$$C_{n+1} = C_n \pm 2^{-k} = C_n + i_c \quad (41)$$

where: $i_s$ is the sine increment; $i_c$ is the cosine increment; and $2^{-k}$ is the quantized single increment, comparable to $\delta$ in size.

Thus, we have:

$$\Delta S_{n+1} = \left[\frac{C_{n+1} + C_n}{2}\right]\delta = \left[\frac{C_n + i_c + C_n}{2}\right]\delta = C_n\delta + i_c\frac{\delta}{2} \quad (42)$$

$$\Delta C_{n+1} = -\left[\frac{S_{n+1} + S_n}{2}\right]\delta = -\left[\frac{S_n + i_s + S_n}{2}\right]\delta = -S_n\delta - i_s\frac{\delta}{2} \quad (43)$$

Equations 42 and 43 indicate that, except for a term of the second order $$\cong i_c\frac{\delta}{2} \text{ or } i_s\frac{\delta}{2}$$

a box-car integration using old values is equivalent to the desired trapezoidal integration requiring new (not yet generated) values. However, in view of the quantization of the integrand in the remainder registers 100 and 104, the inclusion or exclusion of the $$i_c\frac{\delta}{2}, i_s\frac{\delta}{2}$$

terms at any one step will rarely affect the quantized value generated. Therefore, the correction terms can be added to the remainder registers 100 and 104, after the increment of the function is generated just as well as before, thereby making the desired trapezoidal integration.

Therefore, in the embodiment of the invention under $$\cong i_c\frac{\delta}{2}$$

consideration, the $$i_c\frac{\delta}{2} \text{ and } i_s\frac{\delta}{2}$$

corrections are made to the remainder registers 100 and 104 for each computation step, but by the use of the last generated $i_c$ and $i_s$ values. In this manner, the above described cumulative vector growth error is prevented.

It was noted above, that the above-described correction technique of introducing previously-generated terms to the remainder registers for each computation step will rarely affect the result. However, there are certain states of the remainder registers 100 and 104 in which the result will be affected. It is evident, for example, that should the remainder register 100 or 104 have the number 0.11 . . . 111 stored in it, an increment of $$i_c\frac{\delta}{2} = +1, \text{ or } -i_s\frac{\delta}{2} = +1$$

be added, the resulting overflow would result in an erroneous $+1$ being added to the least significant digit position of the addend register 102 or 106. Likewise, should a remainder register have a number 1.00 . . . 000 stored in it, and increment of $$i_c\frac{\delta}{2} = -1 \text{ or } -i_s\frac{\delta}{2} = -1$$

be added, the result would be an erroneous $-1$ being added to the corresponding addend register.

To avoid the errors discussed in the preceding paragraph, it is necessary to observe the new remainder for the critical conditions 0.11 . . . 111 or 1.00 . . . 000, during the generation of the new remainder, and if an overflow condition is found, to reverse the output.

The techniques described above in conjunction with the generation of sines and cosines in the two dimension system, can be extended to the generation of direction cosines in the three dimensional system, in the following manner:

In the incremental generation of the direction cosines, the differential terms $\delta_x$, $\delta_y$, $\delta_z$ are replaced by the difference terms $\omega_x\Delta t$, $\omega_y\Delta t$, $\omega_z\Delta t$. Then the equations become:

$$\begin{vmatrix} \Delta\alpha_1 \\ \Delta\alpha_2 \\ \Delta\alpha_3 \end{vmatrix} = \begin{pmatrix} 0 & \delta_z & -\delta_y \\ -\delta_z & 0 & \delta_x \\ \delta_y & -\delta_x & 0 \end{pmatrix} \begin{vmatrix} \alpha_1 \\ \alpha_2 \\ \alpha_3 \end{vmatrix} = \begin{vmatrix} (\alpha_1)_n \\ (\alpha_2)_n \\ (\alpha_3)_n \end{vmatrix} - \begin{vmatrix} (\alpha_1)_{n-1} \\ (\alpha_2)_{n-1} \\ (\alpha_3)_{n-1} \end{vmatrix} \quad (44)$$

or $$\begin{vmatrix} (\alpha_1)_n \\ (\alpha_2)_n \\ (\alpha_3)_n \end{vmatrix} = \begin{pmatrix} 1 & \delta_z & -\delta_y \\ -\delta_z & 1 & -\delta_x \\ \delta_y & \delta_x & 1 \end{pmatrix} \begin{vmatrix} (\alpha_1)_{n-1} \\ (\alpha_2)_{n-1} \\ (\alpha_3)_{n-1} \end{vmatrix} \quad (45)$$

We note that the matrix 45 has a determinant $1+\delta_x^2+\delta_y^2+\delta_z^2$ which, as in the two-dimensional case discussed above, results in an error vector growth from solution to solution. If now we operate on the intermediate vector, as before, we have:

$$\begin{vmatrix} 1 & -\frac{\delta_z}{2} & \frac{\delta_y}{2} \\ \frac{\delta_z}{2} & 1 & -\frac{\delta_x}{2} \\ \frac{\delta_y}{2} & \frac{\delta_x}{2} & 1 \end{vmatrix} \begin{vmatrix} (\alpha_1)_n \\ (\alpha_2)_n \\ (\alpha_3)_n \end{vmatrix} = \begin{vmatrix} \alpha_1' \\ \alpha_2' \\ \alpha_3' \end{vmatrix} = \begin{pmatrix} 1\frac{\delta_z}{2} & -\frac{\delta_y}{2} \\ -\frac{\delta_z}{2} & 1\frac{\delta_x}{2} \\ \frac{\delta_y}{2} & -\frac{\delta_x}{2} & 1 \end{pmatrix} \begin{vmatrix} (\alpha_1)_{n-1} \\ (\alpha_2)_{n-1} \\ (\alpha_3)_{n-1} \end{vmatrix} \quad (46)$$

Where the determinant of each matrix is identically $$1+\frac{\delta_x^2\delta_y^2\delta_z^2}{4}$$

so that there is no error growth in the vector's magnitude. The above equations result in the following basic difference equations:

$$(\alpha_1)_n - (\alpha_1)_{n-1} = \frac{(\alpha_2)_n+(\alpha_2)_{n-1}}{2}\delta_z - \frac{(\alpha_3)_n+(\alpha_3)_{n-1}}{2}\delta_y$$

$$(\alpha_2)_n - (\alpha_2)_{n-1} = \frac{-(\alpha_1)_n+(\alpha_1)_{n-1}}{2}\delta_z + \frac{(\alpha_3)_n+(\alpha_3)_{n-1}}{2}\delta_x$$

(47)

$$(\alpha_3)_n - (\alpha_3)_{n-1} = \frac{(\alpha_1)_n+(\alpha_1)_{n-1}}{2}\delta_y - \frac{(\alpha_2)_n+(\alpha_2)_{n-1}}{2}\delta_x$$

$$\Delta\alpha_1 = (\alpha_2)_{n-1}\delta_z - (\alpha_3)_{n-1}\delta_y + \left(\frac{i_2\delta_z-i_3\delta_z}{2}\right)$$

$$\Delta\alpha_2 = -(\alpha_1)_{n-1}\delta_z + (\alpha_3)_{n-1}\delta_x + \left(\frac{i_1\delta_z+i_3\delta_z}{2}\right) \quad (48)$$

$$\Delta\alpha_3 + (\alpha_1)_{n-1}\delta_y - (\alpha_2)_{n-1}\delta_x + \left(\frac{i_1\delta_y-i_2\delta_x}{2}\right)$$

The correction is either:

$$\frac{(+1)+(+1)}{2} = +1$$

$$\frac{(+1)+(-1)}{2} = 0$$

$$\frac{(-1)+(+1)}{2} = 0$$

$$\frac{(-1)+(-1)}{2} = -1 \quad (49)$$

The correction is inserted as an initial value into the three adders of the corresponding remainder registers. These adders are the equivalent of the adders 110 and 114 in FIGURE 12. The inputs to the three adders are, therefore:

$$R_1 + (\alpha_2)_{n-1}\delta_z - (\alpha_3)_{n-1}\delta_y + \text{(correction)}$$

$$R_2 + (\alpha_1)_{n-1}\delta_z + (\alpha_3)_{n-1}\delta_x + \text{(correction)} \quad (50)$$

$$R_3 + (\alpha_1)_{n-1}\delta_y - (\alpha_2)_{n-1}\delta_x + \text{(correction)}$$

Where: $R_1$, $R_2$ and $R_3$ represent the numbers in the remainder registers.

When a critical condition occurs in any one of the remainder registers, that is, any of the remainder registers containing a number 0.111 . . . 111 or 1.000 . . . 000, then the critical condition must be overcome, as discussed above. For this purpose two flip-flops $S_1$ and $S_2$ may be included in the system. Appropriate logic is included to set the flip-flop $S_1$ true or false according to the least significant digit of the number $R_n$ in the corresponding remainder register.

The flip-flop $S_2$, on the other hand, is set initially false and scans through the successive digits of the number $R_n$ in the remainder register. The flip-flop $S_2$ is set true, therefore, if any digit of the number $R_n$ is different than the least significant digit. Then if the flip-flop $S_2$ is true at the most significant digit of the number $R_n$, it denotes that there is no critical condition. However, if the flip-flop $S_2$ is false at the most significant digit of the number $R_n$, it indicates that there is a critical condition. For this latter situation, the flip-flop $S_1$ denotes criticality to a $+1$ or $-1$, depending upon whether the flip-flop $S_1$ is true or false.

The basic modules of the system to be described are used to perform three different functions. These functions include the generation of the direction cosines for the $\alpha$'s, $\beta$'s and $\gamma$'s; the generation of velocity pulse increments $\Delta\dot{X}$, $\Delta\dot{Y}$ and $\Delta\dot{Z}$ in space-stabilized coordinates using the direction cosines; and the performance of check computations for the direction cosines.

The module configuration to be described has sufficient flexibility to perform any of the functions mentioned in the preceding paragraph. This flexibility is accomplished by appropriate interconnections within each module and between the separate modules but without changing the module components.

The generation of the direction cosines is represented by the equations:

$$(\Delta\alpha_1)_{n+1} = (\alpha_2)_n(\delta_z)_n - (\alpha_3)_n(\delta_y)_n + \frac{(\Delta\alpha_2)_n(\delta_z)_{n-1}-(\Delta\alpha_3)_n(\delta_y)_{n-1}}{2}$$

(51)

$$(\Delta\alpha_2)_{n+1} = (\alpha_1)_n(\delta_z)_n + (\alpha_3)_n(\delta_x)_n + \frac{(\Delta\alpha_1)_n(\delta_z)_{n-1}+(\Delta\alpha_3)_n(\delta_x)_{n-1}}{2}$$

(52)

$$(\Delta\alpha_3)_{n+1} = (\alpha_1)_n(\delta_y)_n - (\alpha_2)_n(\delta_x)_n + \frac{(\Delta\alpha_1)_n(\delta_y)_{n-1}-(\Delta\alpha_2)_n(\delta_x)_{n-1}}{2}$$

(53)

$$(\Delta\beta_1)_{n+1} = (\beta_2)_n(\delta_z)_n - (\beta_3)_n(\delta_y)_n + \frac{(\Delta\beta_2)_n(\delta_z)_{n-1}-(\Delta\beta_3)_n(\delta_y)_{n-1}}{2}$$

(54)

$$(\Delta\beta_2)_{n+1} = -(\beta_1)_n(\delta_z)_n + (\beta_3)_n(\delta_x)_n + \frac{-(\Delta\beta_1)_n(\delta_z)_{n-1}+(\Delta\beta_3)_n(\delta_x)_{n-1}}{2}$$

(55)

$$(\Delta\beta_3)_{n+1} = (\beta_1)_n(\delta_y)_n - (\beta_2)_n(\delta_x)_n + \frac{(\Delta\beta_1)_n(\delta_y)_{n-1}-(\Delta\beta_2)_n(\delta_x)_{n-1}}{2}$$

(56)

$$(\Delta\gamma_1)_{n+1} = (\gamma_2)_n(\delta_z)_n - (\gamma_3)_n(\delta_y)_n + \frac{-(\Delta\gamma_2)_n(\delta_z)_{n-1}-(\Delta\gamma_3)_n(\delta_y)_{n-1}}{2}$$

(57)

$$(\Delta\gamma_2)_{n+1} = (\gamma_1)_n(\delta_z)_n + (\gamma_3)_n(\delta_x)_n + \frac{(\Delta\gamma_1)_n(\delta_z)_{n-1} + (\Delta\gamma_3)_n(\delta_x)_{n-1}}{2} \quad (58)$$

$$(\Delta\gamma_3)_{n+1} = (\gamma_1)_n(\delta_y)_n - (\gamma_2)_n(\delta_x)_{n-1} + \frac{(\Delta\gamma_1)_n(\delta_y)_{n-1} - (\Delta\gamma_2)(\delta_x)_{n-1}}{2} \quad (59)$$

where $$(\alpha_1)_{n+1} = (\alpha_1)_n + (\Delta\alpha_1)_{n+1}$$

and so on.

Also:

$$(\Delta\dot{X})_{n+1} = (\alpha_1)_n(\Delta\ddot{x})_n + (\alpha_2)_n(\Delta\ddot{y})_n + (\alpha_3)_n(\Delta\ddot{z})_n \quad (60)$$
$$(\Delta\dot{Y})_{n+1} = (\beta_1)_n(\Delta\ddot{x})_n + (\beta_2)_n(\Delta\ddot{y})_n + (\beta_3)_n(\Delta\ddot{z})_n \quad (61)$$
$$(\Delta\dot{Z})_{n+1} = (\gamma_1)_n(\Delta\ddot{x})_n + (\gamma_2)_n(\Delta\gamma)_n + (\gamma_3)_n(\Delta\ddot{z})_n \quad (62)$$

As noted above, the Equations 51–62 may be solved in a parallel manner by three separate incremental computers, all operating in parallel. With such an approach, twelve modules are required to solve Equations 51–62, and three additional modules are required to perform the check computations. This approach is represented by the block diagram of FIGURE 13.

Alternately, and as also pointed out above, the Equations 51–62 can be solved by a single incremental computer composed of five modules. With this latter system, the first module would solve Equations 51–53 in a serial manner; at the same time, the second module would solve Equations 54–56 in a serial manner; and also at the same time, the third module would solve Equations 57–59 in a serial manner.

The fourth module in the system described in the preceding paragraph would solve Equations 60–62 in a serial manner; and the fifth module would serially perform the three check computations.

Each module in FIGURE 13 will include basically the components of the incremental integrator described in conjunction with FIGURE 9. The above described overflow method for obtaining the $\Delta z$ output pulses from the remainder (R) register will be used in the embodiment to be described.

The components included in the $\alpha_1$ module are shown in block form in FIGURE 14. It will be understood that similar components, inter-coupled in the same manner, may be included in the $\alpha_2$, $\alpha_3$, $\beta_1$, $\beta_2$, $\beta_3$, $\gamma_1$, $\gamma_2$, $\gamma_3$ modules. It is for that reason that only $\alpha_1$ module will be discussed in detail herein.

As stated above, the generation of the $\alpha_1$ direction cosine is based on the following equation:

$$(\Delta\alpha_1)_{n+1} = (\alpha_2)_n(\delta_z)_n - (\alpha_3)_n(\delta_y)_n + \text{(correction term)} \quad (63)$$

This is implemented in the $\alpha_1$ module of FIGURE 14. The system included in the module of FIGURE 14 includes a R$\alpha_1$ remainder register 120. A circulating system for the register 120 is provided, and the circulating system includes a four input adder-subtractor 122, which will be described in greater detail in FIGURE 15; and an input logic network 124 which will be described in greater detail in FIGURE 16.

In accordance with Equation 63, the terms $\alpha_2$, $\alpha_3$, $\delta_z$ and $\delta_y$ are introduced to the input logic network 124, and the correction term is also introduced to the input logic network 124 from a correction logic network designated by a block 126. This latter network is made up of a plurality of circuits which are illustrated in detail in FIGURES 17–19.

As described above, certain critical conditions of the R$\alpha_1$ remainder register 120 must be taken care of, and this is achieved by means of a critical condition scanning logic network 128. This latter network will be described in greater detail in conjunction with FIGURE 20. The critical condition scanning logic network 128 received inputs from the correction logic network 126, from the corresponding check module which will be described in greater detail in FIGURE 23, and from the output of the adder-subtractor 122. The outputs from the critical condition scanning logic network 128 are applied to the input logic 124, and these outputs take the form of a pair of terms V and $\overline{V}$.

The overflow $\Delta\alpha_1$ of the remainder register 120 is derived from the adder-subtractor 122 and is introduced to a block 130. The block 130 represents $\Delta\alpha_1$ complementing logic and is controlled by a term $\overline{V'}$ from the critical condition scanning logic 128. The logic network includes a flip-flop with appropriate input logic to permit it to perform a complementing function when the term $\overline{V'}$ is true. The resulting pulse increments $\Delta\alpha_1$ from the network 130 are introduced to a one-increment add-subtract network 132. This latter network is included in the circulating system for the $\alpha_1$ addend register 134. The output from the add-subtract network 132 also supplies the term $\alpha_1$ to the other modules.

The $\alpha_1$ module system of FIGURE 14 includes the R$\alpha_1$ remainder register 120, and it also includes the $\alpha_1$ addend register 134 which accumulates the pulse increments $\Delta\alpha_1$ from the remainder register.

The $\alpha_1$, $\alpha_2$ and correction term inputs to the four input adder-subtractor network 122 correspond to the terms in Equation 63 for the $\alpha_1$ direction cosine generation. An overflow from the R$\alpha_1$ remainder register 120 corresponds to the $(\Delta\alpha_1)_{n+1}$ term of that equation. Actually, as illustrated in FIGURE 14, and as will be described in more detail in FIGURE 15, the overflow $\Delta\alpha_1$ is taken directly from the adder-subtractor network 122 at P21 bit time at the completion of each compute cycle.

The scan for the critical condition in the remainder register 120, as discussed above, is carried out by the critical condition scanning logic network 128, as will be described in more detail in conjunction with FIGURE 20. This scanning is performed on the bits of the multi-digit binary number fed into the remainder register 120 from the output of the adder-subtractor 122. When the term V is true to indicate a critical condition, the scanned bits of the number which has just entered the remainder register 120 are complemented as they enter the adder-subtractor 122 at the beginning of the next compute cycle. If the signal from the corresponding check module also indicates a condition, the term $\overline{V'}$ becomes true and the overflow pulse $(\Delta\alpha_1)$ coming out of the adder 122 immediately following the scanned bits is complemented by the $\Delta\alpha_1$ logic 130. The check module indicates the simultaneous occurrence of a critical condition in other modules such that the terms $(\alpha_2)_n$ and $(\alpha_3)_n$ are not accurate as applied to the input logic of FIGURE 16. The complementing of the overflow term serves to correct the resulting error in the addend register 134 of FIGURE 14.

The pulse increments $\Delta\alpha_1$ represented by the overflow of the remainder register 120 are passed to the network 132 so that these increments may be accumulated in the $\alpha_1$ addend register 134. Therefore, at any particular time, the number in the addend register 134 represents the most significant digits of the $\alpha_1$ term, and the number in the remainder register 120 represents the least significant digits of that term.

The logic suitable for making up the four input adder-subtractor network 122 is shown in FIGURE 15. The adder-subtractor network of FIGURE 15 includes a plurality of analog Kirchoff adders included in a circuit similar to that described and claimed in Patent 2,795,376, which issued June 11, 1957 in the name of the present inventor. The network of FIGURE 15 performs addition and subtraction by analog Kirchoff adders in a feedback configuration, the adders being so organized that the outputs of the individual adders are respectively the sum digit, the first carry digit, and the second carry digit. Similar adders are described, for example, at pages 269–289 of the publication entitled "High Speed Computing Devices" prepared by the staff of Engineering Research Associates, Inc., First edition, McGraw-Hill Book Company, Inc., 1950. It will be obvious, however, that the adder-subtractor 122 may have any other appropriate known configuration. The basic components of the particular adder-subtractor network shown in FIGURE 15 are four operational amplifier type adders 150, 152, 154 and 156; and two one-bit delay registers 158 and 160, which may be flip-flops. The delay registers are used to store the carries $C_1$ and $C_2$. The amplifier type adders are known and may take any appropriate configuration, as is well known to the art. As mentioned above, four input adder-subtractor networks are known to the art, and the system shown in FIGURE 15 represents but one possible embodiment thereof. Other embodiments may be used, as is well known to the art.

The ($C_1$) delay register 158 stores a carry with a value of $2^0 = 1$, and the ($C_2$) delay register 160 stores a carry with a value $2^1 = 2$. Both carries can be used simultaneously during a given add cycle to give any carry up to a value of 3. The carries are summed with the four inputs in the amplifier adder 150 which functions as a preliminary summer.

The output of the preliminary summer 150 can have any one of eight voltage levels corresponding to discrete sums from 0 to 7. The actual sum bit for the particular addition cycle is 0 or 1 depending upon whether the sum from the preliminary summer 150 is even or odd. The actual sum bit $A_n(0,1)$ is formed in the amplifier-adder 152. The two carries are formed from the output of the preliminary summer 150, and they are delayed one bit time, which is the equivalent to one add cycle, in order to be summed with the inputs of the subsequent add cycle.

The amplifier-adders 152, 154 and 156 are connected in the illustrated manner and in accordance with known techniques to provide the proper biasing for one another so that each of the adders may perform its required function.

Subtraction of an input in the adder-subtractor 122 is performed by adding the 2's complement of the number. This is accomplished by feeding the ordinary 1's complement of the number at the input and initially adding a "1" to the carry register 158.

The overflow is derived, by looking at the state of the carry registers 158 and 160 at the end of each compute cycle, that is, at P21 bit time. For this purpose, the outputs from the carry registers are introduced to an "or" gate 162, and the output of the "or" gate is passed through an "and" gate 164. The "and" gate is enabled at P21 bit time, as shown. Therefore, an overflow condition is exhibited, when either of the carry registers 158 and 160 exhibit a "1" at P21 bit time, and this overflow condition is passed on to the add-subtract network 132 of FIGURE 14 through the logic network 130.

The input logic network 124 in FIGURE 14 performs the functions of selecting the complement of an input if it is to be subtracted and of selecting the proper value of the correction term. The input logic network 124 is made up, as shown in FIGURE 16, of a plurality of "and" gates 164, 166, 168, 170, 172, 174, 176, 178 and 180.

The terms $(\delta_z)_n$ and $(\alpha_2)_n$ are introduced to the "and" gate 164, the terms $\overline{(\delta_z)_n}$ and $\overline{(\alpha_2)_n}$ are introduced to the "and" gate 166, the terms $\overline{(\delta_y)_n}$ and $(\alpha_3)_n$ are introduced to the "and" gate 168, and the terms $(\delta y)_n$ and $\overline{(\alpha_3)_n}$ are introduced to the "and" gate 170. The scanning term $V$ is introduced to the "and" gate 172, and the term $R\alpha_1$ is introduced to that "and" gate. The scanning term $\overline{V}$ is introduced to the "and" gate 174, and the term $\overline{R\alpha_1}$ is also introduced to that "and" gate.

As described above, the correction term may be represented as:

$$\frac{(\Delta\alpha_2)_n(\delta_z)_{n-1} - (\Delta\alpha_3)_n(\delta_y)_{n-1}}{2} \quad (64)$$

As described above, this correction term may be $$\frac{(\mp 1)(\pm 1) - (\pm 1)(\pm 1)}{2} \quad (65)$$

Figure 17:
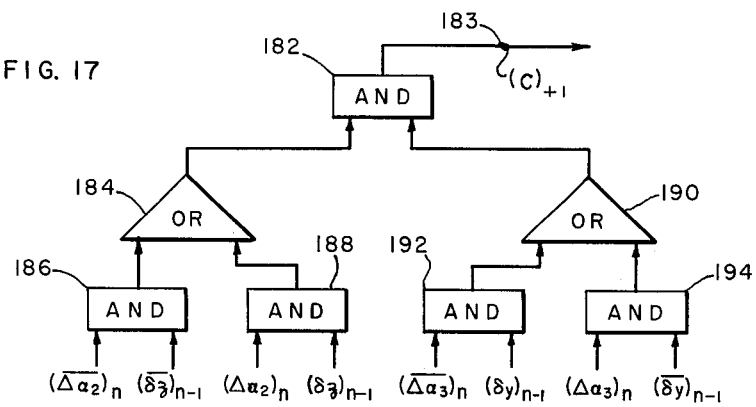
FIGURES 17–19 represent connection logic for the module of FIGURE 15.

When the correction term (64) indicates that a $+1$ correction is to be made, the term $(C)_{+1}$ from the logic of FIGURE 17 becomes true to enable the "and" gate 176. This "and" gate causes a multi-digit binary signal from a suitable source representing $(+1)$ to be passed to the preliminary summer 150 of FIGURE 15.

Figure 18:
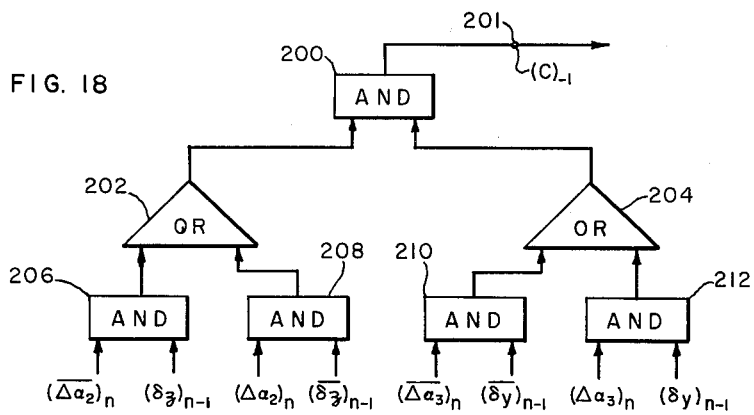
Figure 19:
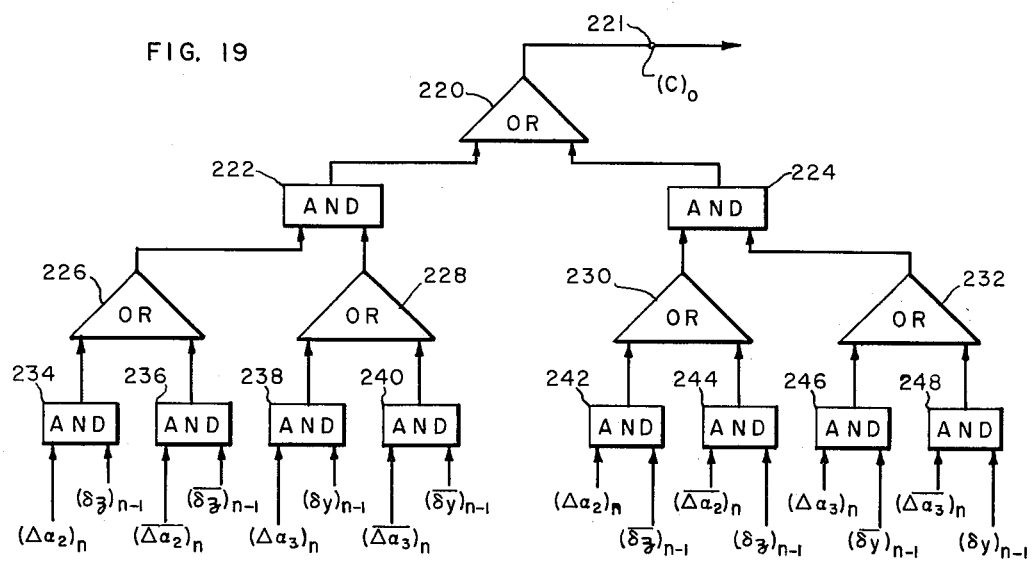

In like manner, when the correction term (64) indicates that a $-1$ correction is to be made, the term $(C)_{-1}$ from the logic of FIGURE 18 becomes true to enable the "and" gate 178. The "and" gate then passes a multi-digit binary signal corresponding to $-1$ from an appropriate source to the preliminary summer 150 in FIGURE 15. Likewise, then the correction term 64 indicates that a 0 correction is to be made, the term $(C)_0$ from the logic of FIGURE 19 is true to enable the "and" gate 180. This latter "and" gate then passes a multi-digit binary signal from an appropriate source and representing 0 to the preliminary summer 150.

The $(C)_{+1}$ selection logic of FIGURE 17 looks at all the combinations of the correction term (64) which indicate that a $+1$ correction should be introduced into the $R\alpha_1$ remainder register 120 of FIGURE 14. If $(\Delta\alpha_2)_n$ and $(\delta_z)_{n-1}$ are similar, and if $(\Delta\alpha_3)_n$ and $(\delta y)_{n-1}$ are dissimilar, a $+1$ correction is required. The logic expression for this is $$(C)_{+1} = [\overline{(\Delta\alpha_2)}_n \overline{(\delta_z)}_{n-1} + (\Delta\alpha_2)_n(\delta_z)_{n-1}]$$
$$[\overline{(\Delta\alpha_3)}_n(\delta_y)_{n-1} + (\Delta\alpha_3)_n(\delta)_{n-1}] \quad (66)$$

The term $(C)_{+1}$ is derived from the logic of FIGURE 17. The logic in FIGURE 17 includes an "and" gate 182 which is connected to the output terminal 183 at which term $(C)_{+1}$ is formed. An "or" gate 184 is connected to the "and" gate 182, and a pair of "and" gates 186 and 188 is coupled to the "or" gate 184. Likewise, an "or" gate 190 is connected to the "and" gate 182, and a pair of "and" gates 192 and 194 is coupled to the "or" gate 190.

The terms $\overline{(\Delta\alpha_2)}_n$ and $\overline{(\delta_z)}_{n-1}$ are introduced to the "and" gate 186; the terms $(\Delta\alpha_2)_n$ and $(\delta_z)_{n-1}$ are introduced to the "and" gate 188; the terms $\overline{(\Delta\alpha_3)}_n$ and $(\delta_y)_{n-1}$ are introduced to the "and" gate 192; and the terms $(\Delta\alpha_3)_n$ and $\overline{(\delta_y)}_{n-1}$ are introduced to the "and" gate 194.

In like manner, the $(C)_{-1}$ selection logic looks at all the combinations of the correction formula which indicate that a $-1$ correction should be introduced into the $R\alpha_1$ remainder register 120 of FIGURE 14. If $(\Delta\alpha_2)_n$ and $(\delta_z)_{n-1}$ are dissimilar, and if $(\Delta\alpha_3)_n$ and $(\delta_y)_{n-1}$ are similar, then a $-1$ correction is required. The logical expression for this is $$(C)_{-1} = [\overline{(\Delta\alpha_2)}_n(\delta_z)_{n-1} + (\Delta\alpha_2)_n\overline{(\delta_z)}_{n-1}]$$
$$[\overline{(\Delta\alpha_3)}_n\overline{(\delta_y)}_{n-1} + (\Delta\alpha_3)_n(\delta_y)_{n-1}] \quad (67)$$

The term $(C)_{-1}$ may be derived by the logic illustrated in FIGURE 18. The illustrated logical system includes an "and" gate 200 having a pair of "or" gates 202 and 204 connected thereto. The "and" gate 200 is connected to the output terminal 201 at which the term $(C)_{-1}$ is formed. A pair of "and" gates 206 and 208 is connected to the "or" gate 202, and a pair of "and" gates 210 and 212 is connected to the "or" gate 204.

The terms $\overline{(\Delta\alpha_2)}_n$ and $(\delta_z)_{n-1}$ are introduced to the "and" gate 206; and the terms $(\Delta\alpha_2)_n$ and $\overline{(\delta_z)}_{n-1}$ are introduced to the "and" gate 208. The terms $(\Delta\alpha_3)_n$ and $\overline{(\delta_y)}_{n-1}$ are introduced to the "and" gate 210, and the terms $(\Delta\alpha_3)_n$ and $(\delta_y)_{n-1}$ are introduced to the "and" gate 212.

The $(C)_0$ selection logic of FIGURE 19 looks at all the combinations of the correction formula 64 which indicate that the 0 correction should be introduced into the $R\alpha_1$ register 120 of FIGURE 14. The term $(C)_0$ may be derived from the logic system illustrated in FIGURE 19 and which includes an "or" gate 220 connected to the output terminal 221 at which the term $(C)_0$ is formed.

A pair of "and" gates 222 and 224 is connected to the "or" gate 220. A pair of "or" gates 226 and 228 is connected to the "and" gate 222, and a pair of "or" gates 230 and 232 is connected to the "and" gate 224. A pair of "and" gates 234 and 236 is connected to the "or" gate 228, and a pair of "and" gates 238 and 240 is connected to the "or" gate 228. A pair of "and" gates 242 and 244 is connected to the "or" gate 230, and a pair of "and" gates 246 and 248 is connected to the "or" gate 232.

The terms $(\Delta\alpha_2)_n$ and $(\delta_z)_{n-1}$ are introduced to the "and" gate 234, and the terms $(\overline{\Delta\alpha_2})_n$ and $(\overline{\delta_z})_{n-1}$ are introduced to the "and" gate 236. The terms $(\Delta\alpha_3)_n$ and $(\delta_y)_{n-1}$ are introduced to the "and" gate 238, and the terms $(\overline{\Delta\alpha_3})_n$ and $(\overline{\delta_y})_{n-1}$ are introduced to the "and" gate 240. The terms $(\Delta\alpha_2)_n$ and $(\overline{\delta_z})_{n-1}$ are introduced to the "and" gate 242, and the terms $(\overline{\Delta\alpha_2})_n$ and $(\delta_z)_{n-1}$ are introduced to the "and" gate 244. The terms $(\Delta\alpha_3)_n$ and $(\overline{\delta_y})_{n-1}$ are introduced to the "and" gate 246, and the terms $(\overline{\Delta\alpha_3})_n$ and $(\delta_y)_{n-1}$ are introduced to the "and" gate 248.

The logic illustrated in FIGURE 19 may be represented by the following logic equation:

$$(C_0) = [(\Delta\alpha_2)_n(\delta_z)_{n-1} + (\overline{\Delta\alpha_2})_n(\overline{\delta_z})_{n-1}]$$
$$[(\Delta\alpha_3)_n(\delta_y)_{n-1} + (\overline{\Delta\alpha_3})_n(\overline{\delta_y})_{n-1}] + (\Delta\alpha_2)_n(\overline{\delta_z})_{n-1}$$
$$+ (\Delta\alpha_3)_n(\delta_z)_{n-1}][(\Delta\alpha_3)_n(\overline{\delta_y})_{n-1} + (\overline{\Delta\alpha_3})_n(\delta_y(_{n-1})] \quad (68)$$

The critical condition scanning logic 128 is shown in greater detail in FIGURE 20. As noted above, the input logic of $\overline{R_{a1}}$ FIGURE 16 performs the function of selecting the complement $\overline{R_{a1}}$ of the output $R_{a1}$ from the remainder register 120 when the term $\overline{V}$ is true, and of selecting the output $R_{a1}$ directly if the term V is true.

The selection signal V from the critical condition scanning logic 128 is normally high to permit the output $R_{a1}$ from the remainder register 120 in FIGURE 14 normally to circulate through the "and" gate 172 (FIGURE 16) of the input logic network 124 as an input to the four-input adder-subtractor 122.

When the selection signal $\overline{V}$ from the critical condition scanning logic 128 is high, it denotes that the scan in the $\alpha_1$ module has indicated the occurrence of a critical condition (1.000 . . . or 0.111 . . . ) in the $R_{a1}$ remainder register 120 of FIGURE 14 requiring that the number in the remainder register 120 of FIGURE 14 be complemented when it next enters the adder-subtractor 122. Should the corresponding check module also indicate a condition of criticality, the term $\overline{C_h}$ is true, and the term $\overline{V'}$ becomes true so that the overflow pulse $(\Delta\alpha_1)$ from the remainder register 120 is complemented by the logic network 130 of FIGURE 14.

As will be explained in more detail in conjunction with FIGURE 23, the corresponding check module compares the sum $\alpha_1^2 + \alpha_2^2 + \alpha_3^2$ with unity to determine whether the sum is greater or less than 1. By simple trigonometry, the sum should always be equal to 1 unless an error has occurred as mentioned above. Should a critical condition occur in either or both the $\alpha_2$ or $\alpha_3$ modules at the same time as a critical condition occurs in the $\alpha_1$ module of FIGURE 14, the terms $(\alpha_2)_n$ and $(\alpha_3)_n$ of FIGURE 16 would be inaccurate. When such a condition occurs, the resulting sum $\alpha_1^2 + \alpha_2^2 + \alpha_3^2$ in the corresponding check module is greater than 1, and this causes the term $\overline{C_h}$ of FIGURE 20 to become true. When that occurs, and a condition of criticality exists in the $R_{a1}$ remainder register 120 of FIGURE 14, the term $\overline{V'}$ becomes true so that the logic 130 of FIGURE 14 can complement the resulting increment $(\Delta\alpha_1)$ so that it is effectively subtracted from, instead of being added to, the contents of the addend register 134 so that any error in the $\alpha_1$ module due to the inaccuracies in the terms $\alpha_2$ or $\alpha_3$ is corrected.

The criticality of the new remainder $R_{a1}$ in the remainder register 120 is determined by the critical condition scanning logic 128 during the generation of that remainder and prior to output to the addend register 134, as described above; while the criticality of the new increment passing through the logic network 130 is established by the corresponding check module at the time of output generation, so that compensation may be made to the addend register.

When the term $\overline{V}$ is true to indicate the condition of criticality in the module $\alpha_1$, this term is used, as mentioned, to enable the "and" gate 174 (FIGURE 16) in the input logic 124 so that bits of the word in the remainder register may be complemented as they are read out of the remainder register 120 for use during the following cycle.

The critical condition scanning logic 128 of FIGURE 20 includes a pair of "and" gates 250 and 252, and it includes a pair of flip-flops S1 and S2. The flip-flop S1 introduces its output term S1 to the "and" gate 250, and introduces its output term $\overline{S1}$ to the "and" gate 252. Likewise, the flip-flop S2 introduces its output term $\overline{S2}$ to the "and" gate 250 and 252. The term $(C)_{+1}$ from the logic circuitry of FIGURE 17 is introduced to the "and" gate 250. The term $(C)_{-1}$ from the logic circuitry of FIGURE 18 is introduced to the "and" gate 252.

An "and" gate 254 is coupled to the true input terminal of the flip-flop S1, and an "and" gate 256 is coupled to the false input terminal of that flip-flop. The output terms $A_n$ and $\overline{A_n}$ from the adder 122 are introduced respectively to the "and" gate 254 and 256. A bit timing pulse $P_0$ is also introduced to these "and" gates so that the "and" gates are enabled only at the first bit time of each compute cycle.

An "or" gate 258 is coupled to the true input terminal of the flip-flop S2, and a pair of "and" gates 260 and 262 is coupled to the "or" gate 258. The output term S1 from the flip-flop S1 is introduced to the "and" gate 260, and the output term $\overline{A_n}$ from the adder 122 is also introduced to that "and" gate. The term $\overline{S1}$ from the flip-flop S1 is introduced to the "and" gate 262, and the term $A_n$ is also introduced to that "and" gate.

The "and" gates 250 and 252 are coupled to an "or" gate 264 which, in turn, is connected to the false input terminal of a flip-flop V included in the scanning logic 128. A bit timing pulse P21 sets the flip-flop S2 false at the end of each compute cycle, and the bit timing pulse $P_0$ sets the flip-flop V true at the beginning of the compute cycle.

The flip-flop V supplies the terms V and $\overline{V}$ to the input logic network 124 of FIGURE 14. The term $\overline{V}$ is also introduced to an "and" gate 266, and the term $\overline{C_h}$ from the corresponding check module is also introduced to the "and" gate 266. The "and" gate 266 applies the term $\overline{V'}$ to the logic network 130 of FIGURE 14.

The bit timing pulse $P_0$ in the logic associated with the S1 flip-flop permits this flip-flop to read only the least significant bit coming out of the adder 122. Subsequent outputs of the adder are compared to the state of the flip-flop S1, by the input logic to the flip-flop S2. If the flip-flop S2 is set high at the end of the compute cycle, it indicates that no critical condition exists. The bit timing pulse P21 resets the flip-flop S2 false prior to the next compute cycle.

Therefore, when the term $\overline{S2}$ is true at P20 bit time, it indicates that a critical condition occurs in the $R_{a1}$ remainder register 120. When the flip-flop S1 is true, in conjunction with the false state of the flip-flop S2, it indicates that an additional positive pulse would change the overflow; and when the flip-flop S1 is false, in conjunction with the false state of the flip-flop S2, it indicates that an additional negative pulse would change the overflow.

The output term $(C)_{+1}$ indicates the occurrence of the positive pulse in the presence of the S1, $\overline{S2}$ critical condition, so that the flip-flop V is set false to render the term $\overline{V}$ true to provide the necessary complementing of the contents of the $R_{a1}$ remainder register for the next compute cycle.

Likewise, should the term $(C)_{-1}$ be true indicating the occurrence of the negative pulse in the presence of the $\overline{S1}$, $\overline{S2}$ critical condition, the "and" gate 252 is enabled so that $\overline{V}$ again may be true to perform the desired complementing action.

Logic from the corresponding check module indicates if any additional pulse should be added to the contents in the $R_{a1}$ remainder register to completely update its value. If the term $\overline{C_h}$ from the check module is true, the term $\overline{V'}$ is produced by the "and" gate 266 and is produced to complement the increment pulse $\Delta\alpha_1$, by means of the logic 130 before that pulse is introduced to the add-subtract network 132.

As noted above, the $\alpha_2$, $\alpha_3$, $\beta_1$, $\beta_2$, $\beta_3$, $\gamma_1$, $\gamma_2$, $\gamma_3$, modules can be identical to the $\alpha_1$ module described above. The $\Delta\dot{x}$, $\Delta\dot{y}$ and $\Delta\dot{z}$ modules can also be identical to one another and similar to the $\alpha_1$ type of module for easy interchangeability. The $\Delta\dot{x}$ module is shown in FIGURE 21.

As also noted, the solution may be made on a serial time-shared basis. In the serial system, the registers 120 and 134 in FIGURE 14 would also contain the $\alpha_2$ and $\alpha_3$ terms; a like module could contain the $\beta_1$, $\beta_2$ and $\beta_3$ terms; a like module would contain the $\gamma_1$, $\gamma_2$ and $\gamma_3$ terms; and the module of FIGURE 21 would contain the $\Delta\dot{x}$, $\Delta\dot{y}$ and $\Delta\dot{z}$ terms.

The $\Delta\dot{x}$ module includes a R$\Delta\dot{X}$ remainder register 270. The circulating system for the register 270 includes a four-input adder-subtractor 272 which may be similar to the adder-subtractor described in FIGURE 15. The circulating system also includes an input logic network 274. The $\Delta\dot{x}$, $\Delta\dot{y}$ and $\Delta\dot{z}$ pulses are introduced to the input logic 274, and they are received from the sensors 10, 12 and 14 of FIGURE 2. The direction cosines $\alpha_1$, $\alpha_2$ and $\alpha_3$ are also introduced to the input logic to be combined with the $\Delta\dot{x}$, $\Delta\dot{y}$ and $\Delta z$ terms from the sensors for application to the adder-subtractor 272. Since the output of the module of FIGURE 21 consists of a sequence of $\Delta\dot{X}$ pulses, rather than their sum, only the R$\Delta\dot{X}$ remainder register 270 is required in this module. The output is simply the overflow coming directly out of the adder-subtractor 272.

The input logic 274 is illustrated in more detail in FIGURE 22. This logic is relatively simple and consists only of complementation an $\alpha_1$ if the corresponding $\Delta\dot{x}$, $\Delta\dot{y}$ or $\Delta\dot{z}$ pulse indicates a subtraction.

The input logic 274, as shown in FIGURE 22, includes a group of three flip-flops A1, A2 and A3. An "or" gate 280 is connected to the input terminal $a_1$ of the flip-flop A1, and an "or" gate 282 is connected to the input terminal $\overline{a_1}$ of that flip-flop. A pair of "and" gates 284 and 286 is connected to the "or" gate 280. A pair of "and" gates 288 and 290 is connected to the "or" gate 282. The terms $\alpha_1$ and $\Delta\dot{x}$ are applied to the "and" gate 284, the terms $\overline{\alpha_1}$ and $\overline{\Delta\dot{x}}$ are applied to the "and" gate 286, the terms $\alpha_1$ and $\overline{\Delta\dot{x}}$ are applied to the "and" gate 288, and the terms $\overline{\alpha_1}$ and $\Delta\dot{x}$ are applied to the "and" gate 290.

A pair of "or" gates 292 and 293 are connected respectively to the input terminals $a_2$ and $\overline{a_2}$ of the flip-flop A2. A pair of "and" gates 294 and 296 is connected to the "or" gate 292, and a pair of "and" gates 298 and 300 is connected to the "or" gate 293. The terms $\alpha_2$ and $\Delta\dot{y}$ are applied to the "and" gate 294, the terms $\overline{\alpha_2}$ and $\overline{\Delta\dot{y}}$ are applied to the "and" gate 296, the terms $\alpha_2$ and $\overline{\Delta\dot{y}}$ are applied to the "and" gate 298; and the terms $\overline{\alpha_2}$ and $\Delta\dot{y}$ are applied to the "and" gate 300.

An "or" gate 302 is connected to the input terminal $a_3$ of the flip-flop A3, and an "or" gate 304 is connected to the input terminal $\overline{a_3}$ of the flip-flop. A pair of "and" gates 306 and 308 is connected to the "or" gate 302, and a pair of "and" gates 310 and 312 is connected to the "or" gate 304. The terms $\alpha_3$ and $\Delta\dot{z}$ are applied to the "and" gate 306, the terms $\overline{\alpha_3}$ and $\overline{\Delta\dot{z}}$ are applied to the "and" gate 308, the terms $\alpha_3$ and $\overline{\Delta\dot{z}}$ are applied to the "and" gate 310, and the terms $\overline{\alpha_3}$ and $\Delta\dot{z}_3$ are applied to the "and" gate 312.

The output terms of the flip-flops A1, A2 and A3, together with the output R$\Delta\dot{X}$ of the remainder register 270, are all introduced to the adder-subtractor 272 of FIGURE 21.

The $\Delta\dot{Y}$ and $\Delta\dot{Z}$ modules may be identical to the $\Delta\dot{X}$ module of FIGURE 21. These modules produce the output signals $\Delta X$, $\Delta Y$ and $\Delta Z$ in accordance with the following equations $$\Delta\dot{X}=\alpha_1\Delta\dot{x}+\alpha_2\Delta\dot{y}+\alpha_3\Delta\dot{z} \quad (69)$$
$$\Delta\dot{Y}=\beta_1\Delta\dot{x}+\beta_2\Delta\dot{y}+\beta_3\Delta\dot{z} \quad (70)$$
$$\Delta\dot{Z}=\gamma_1\Delta\dot{x}+\gamma_2\Delta\dot{y}+\gamma_3\Delta\dot{z} \quad (71)$$

The initial conditions described above may be represented by selected and proper numbers which, in turn, may be stored in a separate memory device. Then, as an initial setting of the system of the invention, the numbers corresponding to these initial conditions are set in the different registers in accordance with usual initial setting techniques.

The check module associated with the module $\alpha_1$ of FIGURE 14 is shown in some detail in FIGURE 23. As mentioned, the logic of this particular check module compares the sum of the terms $\alpha_1^2+\alpha_2^2+\alpha_3^2$ with unity.

The logic shown in FIGURE 23 includes a flip-flop $C_h$. The term P21 is introduced to the true input terminal of the flip-flop to set the flip-flop true at the end of each compute cycle. The false output terminal of the flip-flop $C_h$ introduces the term $\overline{C_h}$ to the "and" gate 266 in the critical condition scanning logic 128 of FIGURE 20. The terms $\alpha_1$, $\alpha_2$, and $\alpha_3$ are introduced to a logic network 314 which may have any suitable known configuration for comparing the sum of the squares of these terms with 1. Whenever that sum is greater than 1, the logic network 314 develops an output term which sets the flip-flop $C_h$ false. This, in turn, causes the term $\overline{C_h}$ to be true, so as to enable the "and" gate 266 in the logic of FIGURE 20 for the reasons described above.

As mentioned above, the actual systems used in the various modules of the combination of the invention may take other forms than those described, and many different forms for these particular logic systems, per se, are known to the art.

The invention, itself, provides an improved system for transforming the coordinates of a vector as referenced to a first coordinate system to corresponding coordinates referenced to a second coordinate system. In a practical application of the invention, the first coordinate system may have its axes fixed with respect to a vehicle, and the second coordinate system may have space-stabilized axes, as described above.

An important feature of the invention is the provision therein of logic systems and circuitry for responding to inherent error tendencies in the system, and for producing counter-acting signals to compensate for such tendencies.

As mentioned above, the system of the invention in the particular described embodiment is advantageous because it can be composed of a plurality of similar modules. This, as mentioned above, tends to simplicity and efficiency in the system, and facilitates the maintenance of the system.

I claim:

1. A system for converting the coordinates of a vector as referenced to a first set of axes in a first coordinate system to coresponding coordinates referenced to a second set of axes in a second coordinate system, said converting system including: first digital sensor means for sensing changes in the coordinates of said vector with respect to the first coordinate system and for producing digital signals representative of such changes; second digital sensor means for sensing angular changes between the axes of the first coordinate system and corresponding ones of the axes of the second coordinate system and for producing digital signals representative of such changes; first incremental computer means coupled to said second sensor means and responsive to the digital signal therefrom for producing first signals representative of incremental changes in a selected trigonometric function of the angular displacements of the axes of the first coordinate system with respect to each of the axes of the second coordinate system and for producing second signals for compensating erroneous changes in said first signals; and second incremental computer means coupled to said first sensor means and to said first incremental computer means and responsive to signals therefrom for producing output signals representative of changes in the coordinates of the vector with respect to the axes of the second coordinate system.

2. A system for converting the coordinates of a vector as referenced to a first set of axes in a first three-dimensional coordinate system to corresponding coordinates referenced to a second set of axes in a second three-dimensional coordinate system, said converting system including: first digital sensor means for sensing linear changes of the coordinates of said vector with respect to said first coordinate system and for producing digital signals representative of such changes; second digital sensor means for sensing angular changes between the axes of the first coordinate system and corresponding ones of the axes of the second coordinate system and for producing digital signals representative of such changes; first incremental computer means coupled to said second sensor means and responsive to the digital signals therefrom for producing first signals representative of incrémental changes in the cosines of the angular displacements of the axes of the first coordinate system with respect to each of the axes of the second coordinate system and for producing second signals for compensating erroneous growths in said first signals; and second incremental computer means coupled to said first sensor means and to said first incremental computer means and responsive to the signals therefrom for producing output signals representative of changes in the coordinates of the vector with respect to the axes of the second coordinate system.

3. A system for converting the coordinates of a velocity vector as referenced to a first set of axes in a first three-dimensional coordinate system to corresponding coordinates referenced to a second set of axes in a second three-dimensional coordinate system, said converting system including: first digital sensor means for sensing linear changes of the coordinates of said velocity vector with respect to the first coordinate system and for producing digital signals representative of such changes, second digital sensor means for sensing angular changes between the axes of the first coordinate system and corresponding ones of the axes of the second coordinate system and for producing digital signals representative thereof; first incremental computer means coupled to said second sensor means and responsive to the digital signals therefrom for producing first signals representative of incremental changes in the cosines of the angular displacements of the axes of the first coordinate system with respect to each of the axes of the second coordinate system and for producing second signals for compensating erroneous growths in said first signals; and second incremental computer means coupled to said first sensor means and to said first incremental computer means and responsive to the signals therefrom for producing output signals representative of changes in the coordinates of the velocity vector with respect to the axes of the second coordinate system.

4. A system for converting the coordinates of a velocity vector referenced to a first set of axes in a first three-dimensional coordinate system to corresponding coordinates referenced to a second set of axes in a second three-dimensional coordinate system, said converting system including: first digital sensor means for sensing linear changes of the coordinates of said velocity vector with respect to the first coordinate system and for producing digital signals representative of such changes; second digital sensor means for sensing angular changes between the axes of the first coordinate system and corresponding ones of the axes of the second coordinate system and for producing digital signals representative thereof; first multi-digit binary incremental computer means coupled to said second sensor means and responsive to the digital signals therefrom for producing first signals representative of incremental changes in the cosines of the angular displacements of the axes of the first coordinate system with respect to each of the axes of the second coordinate system and for producing second signals for compensating erroneous growths in said first signals; said first incremental computer means including a plurality of sections each including a remainder register for accumulating said first signals, a circulating system for said remainder register including an add-subtract network and an input logic network therefor, and means for introducing said second signals into said input logic network to counteract a tendency for said first signals accumulated in said remainder register to change erroneously for successive compute cycles of said first incremental computer means; and second incremental computer means coupled to said first sensor means and to said first incremental computer means and responsive to the signals therefrom for producing output signals representative of changes in the coordinates of the velocity vector with respect to the axes of the second coordinate system.

5. A system for converting the coordinates of a velocity vector referenced to a first set of axes in a first three-dimensional coordinate system to corresponding coordinates referenced to a second set of axes in a second three-dimensional coordinate system, said converting system including: first digital sensor means for sensing linear changes of the coordinates of said velocity vector with respect to the first coordinate system and for producing digital signals representative of such changes; second digital sensor means for sensing angular changes between the axes of the first coordinate system and corresponding ones of the axes of the second coordinate system and for producing digital signals representative thereof; a first multi-digit binary incremental computer means coupled to said second sensor means and responsive to the digital signals therefrom for producing first signals representative of incremental changes in the cosines of the angular displacements of the axes of the first coordinate system with respect to each of the axes of the second coordinate system, and for producing second signals for compensating erroneous growths in said first signals; said first incremental computer means including a plurality of sections each including a remainder register for accumulating said first signals, a circulating system for said remainder register including an add-subtract network and an input logic network therefor, means for introducting a first corrective signal derived from a corresponding one of said second signals into said input logic network to counteract a tendency for a corresponding one of the first signals accumulated in said remainder register to change erroneously for successive compute cycles of said first incremental computer means, and means for introducing a second correction signal derived from a corresponding one of said second signals into said input logic network in response to selected critical conditions in said remainder register; and second incremental computer means coupled to said first sensor means and to said first incremental computer means and responsive to the signals therefrom for producing output signals representative of changes in the coordinates of the velocity vector with respect to the axes of the second coordinate system.

6. A system for converting the coordinates of a velocity vector referenced to a first set of axes in a first three-dimensional coordinate system to corresponding coordinates referenced to a second set of axes in a second three-dimensional coordinate system, said converting system including: first digital sensor means for sensing linear changes of the coordinates of said velocity vector with respect to the first coordinate system and for producing digital signals representative of such changes; second digital sensor means for sensing angular changes between the axes of the first coordinate system and corresponding ones of the axes of the second coordinate system and for producing digital signals representative thereof; first multi-digit binary incremental computer means coupled to said second sensor means and responsive to the digital signals therefrom for producing first signals representative of incremental changes in the cosines of the angular displacements of the axes of the first coordinate system with respect to each of the axes of the second coordinate system, and for producing second signals for compensating erroneous growths in said first signals; said first incremental computer means including a plurality of sections, each including a remainder register for accumulating the least significant digits of a corresponding one of said first signals, an addend register for accumulating the most significant digits of the corresponding one of said first signals, a circulating system for said remainder register including means for introducing overflow signals from said remainder register to said addend register, said circulating system further including an add-subtract network and an input logic network coupled thereto, and means for introducing a correction signal derived from a corresponding one of said second signals into said input logic network to correct a tendency for the signals accumulated in said remainder register to grow erroneously for successive compute cycles of said first incremental computer means, and second incremental computer means coupled to said first digital sensor means and to said first incremental computer means and responsive to signals therefrom producing output signals representative of changes in the coordinates of the velocity vector with respect to the axes of said second coordinate system.

7. A system for converting the coordinates of a velocity vector referenced to a first set of axes in a first three-dimensional coordinate system to corresponding coordinates referenced to a second set of axes in a second three-dimensional coordinate system, said converting system including: first digital sensor means for sensing linear changes of the coordinates of said velocity vector with respect to the first coordinate system and for producing digital signals representative of such changes; second digital sensor means for sensing angular changes between the axes of the first coordinate system and corresponding ones of the axes of the second coordinate system and for producing digital signals representative thereof; first multi-digit binary incremental computer means coupled to said second sensor means and responsive to the digital signals therefrom for producing first signals representative of incremental changes in the cosines of the angular displacements of the axes of the first coordinate system with respect to each of the axes of the second coordinate system, and for producing second signals for compensating erroneous growths in said first signals; said first incremental computer means including a plurality of sections each including a remainder register for accumulating the least significant digits of a corresponding one of said first signals, an addend register for accumulating the most significant digits of the corresponding one of said first signals, a circulating system for said remainder register including means for introducing overflow signals from said remainder register to said addend register, said circulating system further including an add-subtract network and an input logic network coupled thereto, means for introducing a first corrective signal derived from a corresponding one of said second signals into said input logic network to counteract a tendency for the signals accumulated in said remainder register to grow erroneously for successive compute cycles of said first incremental computer means, and means for introducing a second corrective signal derived from the corresponding one of said second signals into said input logic network in response to selected critical conditions in said remainder register; and second incremental computer means coupled to said first sensor means and to said first incremental computer means and responsive to the signals therefrom for producing output signals representative of changes in the coordinates of the velocity vector with respect to the axes of the second coordinate system.

8. An inertial guidance system for a vehicle including: first digital sensor means mounted in the vehicle for sensing movements of the vehicle with respect to the axes of a first vehicle-fixed three-dimensional coordinate system and for producing digital signals representative of changes of such movements; second digital sensor means mounted in the vehicle for sensing angular movements of the vehicle about the respective axes of a second space-stabilized three-dimensional coordinate system and for producing digital signals representative of changes in such angular movements; first incremental computer means coupled to said sensor means and responsive to the digital signals therefrom for producing first signals representative of the incremental changes in the cosine of the angular displacements of the axes of the first coordinate system with respect to each of the axes of the second coordinate system and for producing second signals for compensating erroneous growths in said first signals; and second incremental computer means coupled to said first sensor means and to said first incremental computer means for producing output signals representative of changes in the corresponding coordinates of movements of the vehicle with respect to the axes of the second coordinate system.

9. An inertial guidance system for a vehicle including: first digital sensor means mounted in the vehicle for sensing velocity changes of the vehicle with respect to the axes of a first vehicle-fixed three-dimensional coordinate system and for producing digital signals representative of such velocity changes; second digital sensor means mounted in the vehicle for sensing angular velocities of the vehicle about the respective axes of a second space-stabilized three-dimensional coordinate system and for producing digital signals representative of such angular velocities; first incremental computer means coupled to said second sensor means and responsive to the digital signals therefrom for producing first signals representative of the incremental changes in the cosines of the angular displacements of the axes of the first coordinate system with respect to each of the axes of the second coordinate system and for producing second signals for compensating erroneous growths in said first signals; and second computer means coupled to said first sensor means and to said first incremental computer means and responsive to the signals therefrom for producing output signals representative of changes in the coordinates of the velocity of the vehicle with respect to the axes of the second coordinate system.

References Cited by the Examiner

UNITED STATES PATENTS

| | | | |
|---|---|---|---|
| 2,841,328 | 7/1958 | Steele et al. | 235—152 |
| 2,852,187 | 9/1958 | Beck. | |
| 2,895,670 | 7/1959 | Newell | 235—61 |
| 2,945,643 | 7/1960 | Slater | 244—14 |
| 2,995,302 | 8/1961 | Ingwerson et al. | 235—152 |
| 3,009,638 | 11/1961 | Merz et al. | 235—152 |
| 3,033,453 | 5/1962 | Lode | 235—152 XR |

OTHER REFERENCES

Pages 1895–1899, November 1960, Silber, "Function Generation with a DDA," Instruments and Control Systems.

Pages 28–02 to 28–11 and 29–17 to 29–29, 1959, Grabbe et al., Handbook of Automation Computation and Control.

MALCOLM A. MORRISON, *Primary Examiner.*

WALTER W. BURNS, JR., *Examiner.*